United States Patent [19]

Inoue et al.

[11] Patent Number: 5,684,766
[45] Date of Patent: Nov. 4, 1997

[54] OPTICAL DISK LIBRARY APPARATUS WITH AUTOMATIC HEAD CLEANING FUNCTION

[75] Inventors: Kazuhiko Inoue; Kenji Nakajima; Tsuyoshi Inokuchi, all of Kawasaki, Japan

[73] Assignee: Fujitsu Limited, Kawasaki, Japan

[21] Appl. No.: 727,324

[22] Filed: Oct. 8, 1996

Related U.S. Application Data

[63] Continuation of Ser. No. 321,431, Oct. 10, 1994, abandoned.

[30] Foreign Application Priority Data

Dec. 27, 1993 [JP] Japan .................................. 5-331628
Jul. 28, 1994 [JP] Japan .................................. 6-176580

[51] Int. Cl.⁶ .............................. G11B 3/58; G11B 17/22
[52] U.S. Cl. ................................................. 369/36; 369/71
[58] Field of Search ................................ 369/36, 71, 72, 369/73; 360/128, 137

[56] References Cited

U.S. PATENT DOCUMENTS

| | | | |
|---|---|---|---|
| 4,586,100 | 4/1986 | Howe et al. | 360/128 |
| 4,594,617 | 6/1986 | Tezuka | 360/128 |
| 5,157,646 | 10/1992 | Amemiya et al. | 369/36 |
| 5,471,451 | 11/1995 | Masaki et al. | 369/71 |

FOREIGN PATENT DOCUMENTS

| | | |
|---|---|---|
| 61-198413 | 9/1986 | Japan . |
| 2-35618 | 2/1990 | Japan . |
| A2168481 | 6/1990 | Japan . |
| 3-266276 A | 11/1991 | Japan . |
| 4-319571 | 11/1992 | Japan . |
| 6-76334 | 3/1994 | Japan . |

*Primary Examiner*—Stuart S. Levy
*Assistant Examiner*—Adriana Giordana
*Attorney, Agent, or Firm*—Greer, Burns & Crain, Ltd.

[57] ABSTRACT

An optical disk library apparatus equipped with a function of automatically cleaning an optical head in a drive unit. This optical disk library apparatus comprises a cartridge entry/eject mechanism for entering an optical disk cartridge into the library apparatus and ejecting the optical disk cartridge from the library apparatus. Also included is a cell unit having a plurality of cells each for holding the optical disk cartridge therein, a drive unit having an optical head to record data on and/or to reproduce the same from the optical disk cartridge, and outputting a head cleaning request signal on the basis of information relative to soil of the optical head, and an accessor for carrying the optical disk cartridge among the cartridge entry/eject mechanism, the cell unit and the drive unit. The optical disk library apparatus further includes an accessor control means for controlling the accessor to carry a cleaning cartridge from the cell unit to the drive unit in response to a head cleaning request signal obtained from the drive unit. When a cleaning request signal is outputted, the optical head is automatically cleaned by the use of the cleaning cartridge carried by the accessor.

13 Claims, 25 Drawing Sheets

FIG. 19

Nonvolatile Memory — 40

| Bit<br>Byte | 7 | 6 | 5 | 4 | 3 | 2 | 1 | 0 |
|---|---|---|---|---|---|---|---|---|
| 0 | Element Address ||||||||
| 1 | ||||||||
| 2 | Reserved |||| ACCESS | EXCEPT | Reser-ved | FULL |
| 3 | Reserved ||||||||
| 4 | Additional Sense Code ||||||||
| 5 | Additional Sense Qualifier ||||||||
| 6 | Reserved ||||||||
| 7 | Reserved ||||||||
| 8 | Reserved ||||||||
| 9 | Valid | Invert | Reserved ||||||
| 10 | Source Storage Element Adress ||||||||
| 11 | ||||||||
| 12 | Reserved ||||||||
| 13 | Reserved ||||||| FLAG |

FIG. 20

Nonvolatile Memory

| Bit<br>Byte | 7 | 6 | 5 | 4 | 3 | 2 | 1 | 0 |
|---|---|---|---|---|---|---|---|---|
| 0 | Element Address ||||||||
| 1 | ||||||||
| 2 | Reserved |||| ACCESS | EXCEPT | Reser-ved | FULL |
| 3 | Reserved ||||||||
| 4 | Additional Sense Code ||||||||
| 5 | Additional Sense Qualifier ||||||||
| 6 | Cleaning Number ||||||||
| 7 | ||||||||
| 8 | Service Life of Cleaning Cartridge ||||||||
| 9 | ||||||||

40

OPTICAL DISK LIBRARY APPARATUS WITH AUTOMATIC HEAD CLEANING FUNCTION

This application is a continuation of application Ser. No. 08/321,431 filed on Oct. 10, 1994 abandoned.

BACKGROUND OF THE INVENTION

1. Field of the Invention

The present invention relates to an optical disk library apparatus equipped with a head cleaning mechanism for a drive unit.

2. Description of the Related Art

There is known an optical disk device (optical disk drive unit) used as an external memory for a computer. An optical disk cartridge with an optical disk medium contained in a case is loaded in the optical disk drive unit, and an operation of recording and/or reproducing data is performed. In general, an optical disk library apparatus comprises a cartridge access station (CAS) for entering and ejecting an optical disk cartridge, a cell drum having a plurality of cells to hold the cartridges therein, a drive unit for recording and/or reprodcing data on the optical disk cartridge, and an accessor or carrying the cartridge among the cartridge access station, the cell drum and the drive unit. Such an optical disk library apparatus is frequently employed of late as an external memory of a great storage capacity for a computer, and high reliability is required so that an accurate operation can be ensured even in a completely automated system.

An exemplary construction of a conventional optical disk library apparatus will now be described below with reference to FIGS. 23 and 24. This optical disk library apparatus comprises a cartridge access station (CAS) 5 for entering and ejecting a cartridge, a cell drum 3, a plurality of drive units 6, and an accessor 2, wherein a plurality of optical disk cartridge are held in the cell drum, and data is automatically recorded on and/or reproduced from a selected optical disk cartridge in the drive unit.

It is customary that a plurality of drive units 6 are incorporated in such a manner as to be capable of recording data on and/or reproducing the same respectively from optical disk cartridges. The cell drum 3 has a multiplicity of cells 4 therein, and one optical disk cartridge is held in each of such cells 4.

In the cartridge access station 5, an optical disk cartridge entered externally by an operator is carried up to a transfer position to the accessor 2 or an optical disk cartridge already used is received from the accessor 2 and is carried up to a predetermined position so as to be ejected to the outside. The accessor 2 is displaced upward or downward along a guide shaft to thereby carry the optical disk cartridge among the cartridge access station 5, the cell drum 3 and the drive unit 6.

FIG. 24 is a block diagram of a control system for the conventional optical disk library apparatus. As shown in this diagram, the control system for the optical disk library apparatus includes an interface controller 9, an accessor controller 10 and an accessor mechanism controller 11, and the accessor controller 10 has a memory 12. The drive unit 6 includes an optical disk drive 15 and a drive controller 14. The interface controller 9 and the drive controller 14 are connected to a host computer 8.

The interface controller 9 performs various interface control actions relative to the host computer 8, such as input or output of a command from or to the host computer 8, analysis of a command, or transfer of data. Meanwhile the accessor controller 10 performs various control actions to both of the accessor 2 and the cartridge access station 5. The accessor controller 10 receives, for example, the result of a command analysis from the interface controller 9 and instructs the accessor 2 and the cartridge access station 5 to carry an optical disk cartridge.

In response to an instruction from the accessor controller 10, the accessor mechanism controller 11 controls the drive mechanisms of the accessor 2 and the cartridge access station 5. The memory 12 is used for work by the accessor controller 10 to store, e.g., presence/absence data of an optical disk cartridge. And the drive controller 14 controls the optical disk drive 15 in each drive unit 6.

In operation, when an optical disk cartridge is entered by an operator from a cartridge entry/eject slot formed in the cartridge access station 5, the cartridge access station 5 carries the cartridge up to a predetermined position and transfers the same to the accessor 2. Then the accessor 2 carries the optical disk cartridge received from the cartridge access station 5 and inserts the cartridge into the designated cell 4 of the cell drum 3.

When data is to be recorded on or reproduced from the optical disk cartridge, the accessor 2 takes out the desired cartridge from the designated cell 4 of the cell drum 3 and then inserts the cartridge into the designated drive unit 6. Upon completion of the data recording or reproduction with respect to the medium of the optical disk cartridge, the accessor 2 carries the optical disk cartridge from the drive unit and inserts the same into the designated cell 4 of the cell drum 3. When the optical disk cartridge already used is to be ejected to the outside, the accessor 2 takes out the cartridge from the designated cell 4 of the cell drum 3 and carries the same up to the cartridge access station 5. Then the cartridge access station 5 carries the received cartridge up to a predetermined position and ejects the same from the eject slot to the outside.

Generally the magneto-optical disk recording method is classified into an optical modulation system and a magnetic modulation system. According to the optical modulation system, a laser beam is irradiated onto a magneto-optical disk in compliance with the presence or absence of a signal with continuous application of an external low-intensity DC magnetic field. Meanwhile in the optical modulation system, when a rerecording operation is to be performed in a recorded area, it is necessary first to erase the recorded portion and then to record new data, so that overwriting is impossible. However, in the magnetic modulation system, a laser beam of a fixed intensity is irradiated, and an external magnetic field is inverted in compliance with the presence or absence of a signal. According to this system, it is possible to execute both overwriting and fast transfer. The recorded data is read out by irradiating a laser beam via an optical head to the medium and utilizing the magnetic Kerr effect that the plane of polarization of the linearly polarized light is rotated in accordance with the magnetization of a magnetic recording film.

In the optical disk drive unit for reproduction of the data by utilizing the magnetic Kerr effect, if some dirt or dust is deposited on its optical head, proper irradiation of a laser beam to the medium surface fails to be performed due to a reduction of the light amount. Furthermore, since the reflected light from the medium is extremely feeble, read errors are prone to occur. More specifically, if the optical head is soiled with some dirt or dust, there arise problems including attenuation of the reproduced signal and waveform distortion thereof to consequently cause erroneous reproduction of the data. And in a recording mode, erroneous data writing is induced. For this reason, it becomes necessary to clean the optical head.

Now a conventional head cleaning method known heretofore will be described below with reference to FIG. 25. First at step 1, the host computer 8 issues a command to carry an optical disk cartridge to the optical disk drive 6. The command thus issued is analyzed in the interface controller 9, and the result of such analysis is supplied to the accessor controller 10. Then the accessor controller 10 receives the analytic result and calculates the position to which the optical disk cartridge is to be carried and also the required displacement distance of the accessor 2, and sends an instruction to the accessor mechanism controller 11. In response to this instruction, the accessory mechanism controller 11 drives a motor provided in the drive mechanism of the accessor 2, thereby displacing the accessor 2.

At step 2, the accessor 2 takes out one optical disk cartridge held in the cell 4 at the designated position, and carries the cartridge to the position of the designated drive unit 6. The accessor 2 further inserts the optical disk cartridge into the drive unit 6 from the cartridge inlet opening formed therein, whereby the optical disk cartridge is loaded in the drive unit 6 so as to be placed in a standby state ready for data recording and/or reproduction.

In this stage of the procedure, the accessor controller 10 makes a decision at step 3 as to whether the process at step 2 is properly completed or not. If the result of such a decision signifies a failure of proper carry of the cartridge, the accessor controller 10 executes an error process and sends an error report via the interface controller 9 to the host computer 8. If the result of the above decision signifies proper completion of the process at step 2, the procedure advances to step 4, where the accessor controller 10 renews the cartridge information stored in the internal memory 12, thereby storing the updated information which represents completion of carrying the optical disk cartridge to the designated drive unit.

Subsequently the procedure advances to step 5, where the host computer 8 issues a data read or write command to the drive unit 6. This command is analyzed in the drive controller 14, which then controls the optical disk drive 15 to thereby perform a data read or write operation on the optical disk cartridge. At step 6, the drive unit itself makes a decision as to whether head cleaning is necessary or not. (This point will be described in detail later.) When the result of such a decision signifies that head cleaning is necessary, the drive controller 14 reports the necessity of head cleaning to the host computer 8.

At step 7, the host computer 8 displays a message, which indicates the necessity of head cleaning, on a display panel to thereby warn the operator. Upon watching this message, the operator stops the running of the optical disk library apparatus and cleans the optical head in the drive unit.

As described above, there is known a drive unit which makes a decision by itself as to whether head cleaning is necessary or not during a data read or write mode. For example, the necessity of head cleaning is decided by the following method. A RAM and a writable nonvolatile memory are incorporated in a drive controller of a drive unit. And a cleaning counter is provided in the RAM, while another cleaning counter and a cleaning flag are provided in the nonvolatile memory.

In a normal running state, the drive controller measures the rotation time of a spindle motor for rotating a disk medium, and the cleaning counter in the RAM counts the rotation time. And when the cleaning counter in the RAM has reached a predetermined value, the cleaning counter in the nonvolatile memory counts up by plus 1, and the cleaning counter in the RAM is cleared. Thereafter the drive controller measures again the rotation time of the spindle motor, and the cleaning counter in the RAM counts the rotation time. And when the cleaning counter in the RAM has reached the predetermined value, the cleaning counter in the nonvolatile memory counts up by plus 1 again, and the cleaning counter in the RAM is cleared.

The above process is executed repeatedly and, when the value of the cleaning counter in the nonvolatile memory has reached a preset value, the drive controller 14 decides the necessity of head cleaning and then turns on the cleaning flag. In response to such turn-on of the cleaning flag, the drive controller 14 informs the host computer of a head cleaning request.

Upon reception of such a head cleaning request, the host computer displays a message, which indicates the necessity of head cleaning, on a display panel to inform the operator that head cleaning is necessary. Then the operator inserts a cleaning cartridge into the optical disk drive unit to thereby clean the optical head.

Thus, in the conventional optical disk library apparatus known heretofore, the operator inserts a cleaning cartridge into the drive unit each time necessary to clean the optical head in the drive unit. However, since automatic cleaning of the optical head is impossible in the prior art, the operator needs to insert a cleaning cartridge manually into the drive unit to consequently cause considerable inconvenience. Particularly in all-night running of an optical disk library apparatus, it is rendered extremely difficult to achieve the manual head cleaning by an operator after temporarily halting the running apparatus, and therefore the desired cleaning is substantially impossible.

In the operation of cleaning the optical head by actuating the accessor to carry a cleaning cartridge to the drive unit, it has been requisite, in the prior art, for the host computer to recognize the cell where the cleaning cartridge is held, thereby causing an increase of the load on the host computer. And in the conventional apparatus, it is impossible on the accessor side to distinguish between a cleaning cartridge and an ordinary cartridge. Consequently there arises a problem that, depending on some of cleaning cartridges available in various kinds, the drive unit does not accept the cartridge and ejects the same immediately, so that the accessor recognizes this action as a failure in carrying the cartridge.

SUMMARY OF THE INVENTION

It is therefore an object of the present invention to provide an optical disk library apparatus wherein an optical head in each drive unit can be cleaned automatically whenever such cleaning becomes necessary.

Another object of the present invention resides in providing an optical disk library apparatus wherein an accessor is enabled to discriminate between a cleaning cartridge and an ordinary cartridge so that the cleaning cartridge can be kept under control of the accessor.

According to a first aspect of the present invention, there is provided an optical disk library apparatus comprising: a cartridge entry/eject mechanism for entering an optical disk cartridge into the library apparatus and ejecting the optical disk cartridge therefrom; a cell unit having a plurality of cells to hold optical disk cartridges therein; a drive unit having an optical head to perform a data recording/ reproducing operation on the optical disk cartridge; a drive unit for outputting a head cleaning request signal on the basis of information relative to any soil of the optical head; an accessor for carrying the optical disk cartridge among the cartridge entry/eject mechanism, the cell unit and the drive unit; a head cleaning cartridge housed in the cell unit; and an accessor control means actuated in response to the head cleaning request signal obtained from the drive unit and controlling the accessor to carry the cleaning cartridge from the cell unit to the drive unit; wherein, when the head cleaning request signal is outputted, the optical head is cleaned automatically with the cleaning cartridge carried by the accessor.

In the first aspect of the present invention mentioned above, the accessor control means responsive to output of the head cleaning request signal from the drive unit controls the accessor to carry the cleaning cartridge, which is held in the cell unit, up to the drive unit. Then the drive unit cleans the optical head automatically by using the cleaning cartridge carried thereto by the accessor.

Preferably a cleaning cartridge discriminator is provided in the cartridge entry/eject mechanism so as to discriminate whether the entered cartridge is a cleaning cartridge or not. When the entered cartridge is judged to be a cleaning cartridge, the accessor control means controls the accessor in such a manner as to insert the cleaning cartridge into a predetermined cell in the cell unit.

The accessor control means has a nonvolatile memory to store the number of times of using the cleaning cartridge, and additionally increases the stored numerical value in the nonvolatile memory each time the head cleaning is performed. And when the number of times of using the cleaning cartridge thus stored has reached a preset value, information indicating the necessity of replacement of the cleaning cartridge is displayed on a display means.

According to a second aspect of the present invention, there is provided an optical disk library apparatus comprising: a cartridge entry/eject mechanism for entering an optical disk cartridge into the library apparatus and ejecting the optical disk cartridge therefrom; a cell unit having a plurality of cells to hold optical disk cartridges therein; a drive unit having an optical head to perform a data recording/reproducing operation on the optical disk cartridge; an accessor for carrying the optical disk cartridge among the cartridge entry/eject mechanism, the cell unit and the drive unit; a head cleaning cartridge held in the cell unit; and accessor control means having a timer to measure the accumulated use time of the drive unit and controlling the accessor, upon arrival of the measured time to a predetermined value, in such a manner that the cleaning cartridge held in the cell unit is carried up to the drive unit by the accessor; wherein, when the time measured by the timer has reached a predetermined value, the optical head is cleaned automatically by using the cleaning cartridge carried by the accessor.

In the second aspect of the present invention, the accessor control means is actuated when the timer incorporated therein has measured a predetermined accumulation time, and controls the accessor to carry the cleaning cartridge from the cell unit to the drive unit. Then, in the drive unit, the optical head is cleaned by using the cleaning cartridge thus carried by the accessor.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 19 shows drive information stored in a nonvolatile memory;

FIG. 20 shows cleaning cartridge information stored in a nonvolatile memory;

DESCRIPTION OF THE PREFERRED EMBODIMENTS

Figure 1:
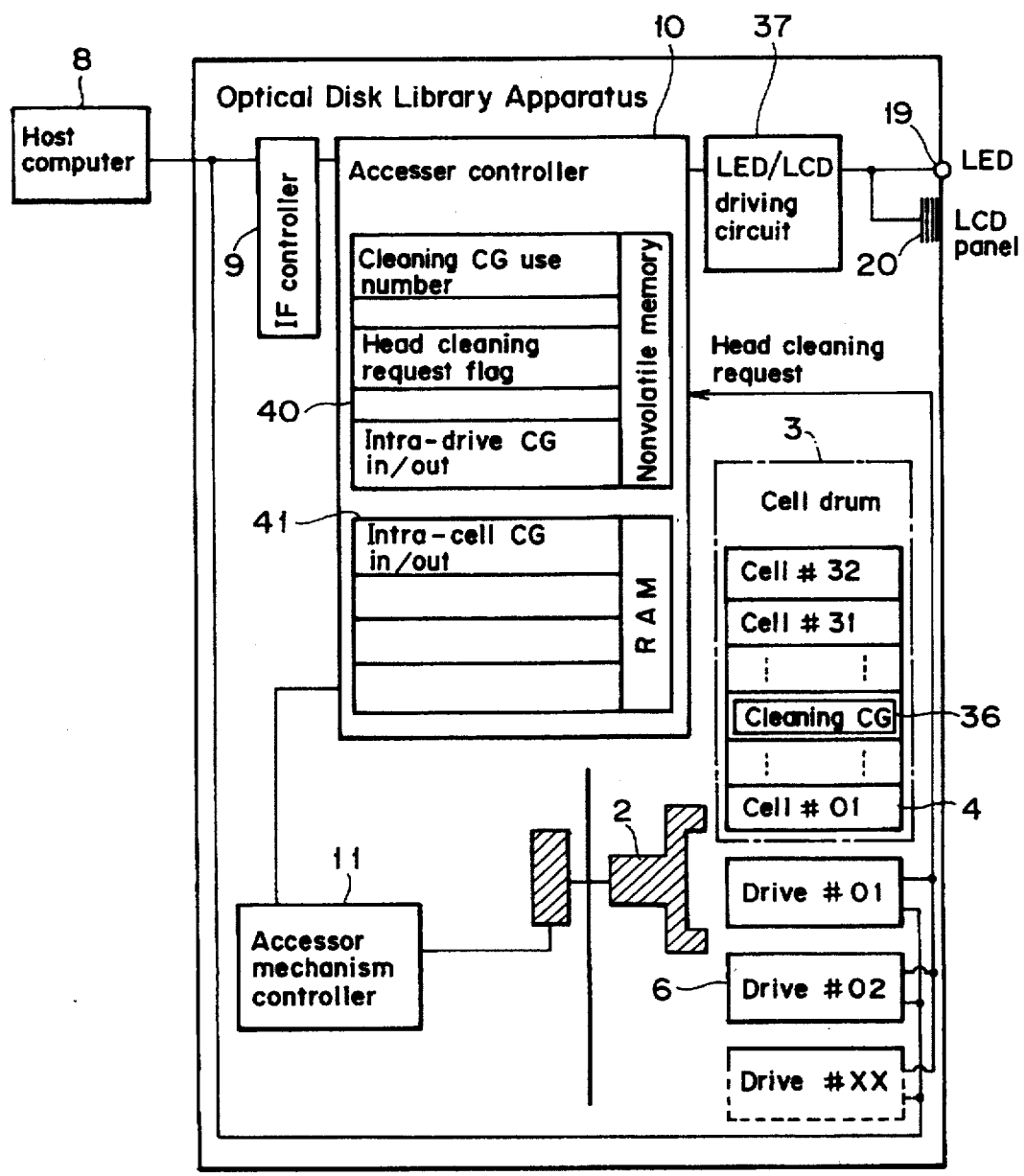
FIG. 1 is a block diagram showing the whole constitution of the present invention.

First the whole constitution of the present invention will be schematically described with reference to a block diagram of FIG. 1. The optical disk library apparatus of the invention includes a cell drum 3 having a plurality of cells 4 to hold optical disk cartridges therein. And a cleaning cartridge 36 is held in a predetermined cell 4 of the cell drum 3. A plurality of drive units 6 are provided in the optical disk library apparatus. Each of the drive units 6 has an optical head to perform a data recording/reproducing operation on an optical disk cartridge and outputs a head cleaning request signal on the basis of information relative to soil of the optical head.

An accessor 2 carries an optical disk cartridge among an unshown cartridge access station which enters and ejects the optical disk cartridge, the cell drum 3 and the drive unit 6. The accessor controller 10 has a nonvolatile memory 40 for storing the number of uses of a cleaning cartridge 36, and a RAM 41 for storing information which indicates the presence or absence of an optical disk cartridge in each cell 4 of the cell drum 3.

When a host computer 8 issues a command for carrying an optical disk cartridge from the cell drum 3 to the drive unit 6, this command is analyzed by an interface controller 9, and the result of such analysis is inputted to an accessor controller 10. Then the accessor controller 10 calculates, on the basis of the input result, the arrival position of the optical disk cartridge to be carried and the required displacement distance of the accessor 2, and sends an instruction to an accessor mechanism controller 11. Subsequently, in response to this instruction, the accessor mechanism controller 11 drives the motor of the accessor 2 to thereby displace the accessor 2.

The accessor 2 takes out the optical disk cartridge held in the cell 4 at the designated position and, after carrying the cartridge up to the designated position of the drive unit 6, inserts the cartridge into an inlet opening of the drive unit 6, whereby the optical disk cartridge is loaded in the drive unit 6 and is placed in a standby state ready for data recording and reproduction. The accessor controller 10 renews the cartridge information stored in both a nonvolatile memory 40 and a RAM 41, wherein the carry of the cartridge to the drive unit 6 is thus stored.

When the host computer 8 issues a data read or write command to the drive unit 6, the drive unit 6 performs a data read or write operation. In this stage, the drive unit 6 makes a decision as to whether head cleaning is necessary or not, on the basis of the information relative to soil of the optical head. If the result of such a decision signifies that head cleaning is not necessary, a normal operation is performed to complete the process.

In case the result of the above decision signifies the necessity of head cleaning, a head cleaning request signal is outputted from the drive unit 6 to the accessor controller 10 to thereby inform the controller 10 that head cleaning is necessary. In response to such a head cleaning request signal, the accessor controller 10 raises a head cleaning request flag in the nonvolatile memory 40 corresponding to the relevant drive unit.

Upon completion of a data read/write process, the drive unit reports the completion to the host computer 8. In response to this report, the host computer confirms the completion of the read/write process, and subsequently issues a command for returning the inserted optical disk cartridge from the drive unit 6 to the cell 4. Then the accessor controller 10 recognizes, on the basis of this command, the arrival position of the optical disk cartridge to be carried and calculates the required displacement distance of the accessor 2. Thereafter the accessor 2 takes out and carries the cartridge from the designated drive unit 6 and returns the cartridge to the former cell.

Upon completion of this procedure, the accessor controller 10 renews the internal cartridge information to thereby indicate that the optical disk cartridge has been drawn out from the drive unit 6. When the cartridge is no longer existent in the drive unit 6, the accessor controller 10 drives the accessor 2 via the accessor mechanism controller 11.

The accessor 2 takes out a cleaning cartridge 36 held in a specific cell 4, then carries the same to a target drive unit and inserts the same therein. In this stage, the accessor controller 10 renews the internal cartridge information to indicate that the cleaning cartridge has been carried to the drive unit 6. And after insertion of the cleaning cartridge, the drive unit 6 automatically starts a head cleaning operation.

Upon start of the head cleaning in the drive unit 6, the accessor controller 10 controls an LED/LCD driving circuit 37 to thereby display on an LCD panel 20 a message which signifies a head cleaning mode. Upon completion of the head cleaning, the drive unit 6 sends a head cleaning end signal to the accessor controller 10, which then confirms the end of the head cleaning.

After the end of the head cleaning, the accessor 2 carries, under control of the accessor controller 10, the cleaning cartridge ejected from the drive unit 6 and carries the same back to the former cell. Upon completion of this process, the accessor controller 10 renews the internal cartridge information to store that the cleaning cartridge has been ejected from the drive unit 6.

Controlling the LED/LCD driving circuit 37, the accessor controller 10 erases the message of a head cleaning mode displayed on the LCD panel 20. Further the accessor controller 10 counts up the number of times of using the cleaning cartridge stored in the internal nonvolatile memory 40. Thereafter the accessor controller 10 reads out the number stored in the nonvolatile memory 40 and compares this number with a preset value to thereby make a decision as to whether the service life of the cleaning cartridge has expired or not.

If the result of such a decision signifies that the service life of the cleaning cartridge has expired, the accessor controller 10 controls the LED/LCD driving circuit 37 to display, on the LCD panel 20, a message which recommends a replacement of the cleaning cartridge. Thereafter the accessor controller 10 informs the host computer 8 via the interface controller 9 that the cleaning cartridge needs to be replaced. In this manner, the operator is informed of the replacement time of the cleaning cartridge.

Hereinafter a preferred embodiment of the present invention will be described in detail with reference to the accompanying drawings.

Figure 2:
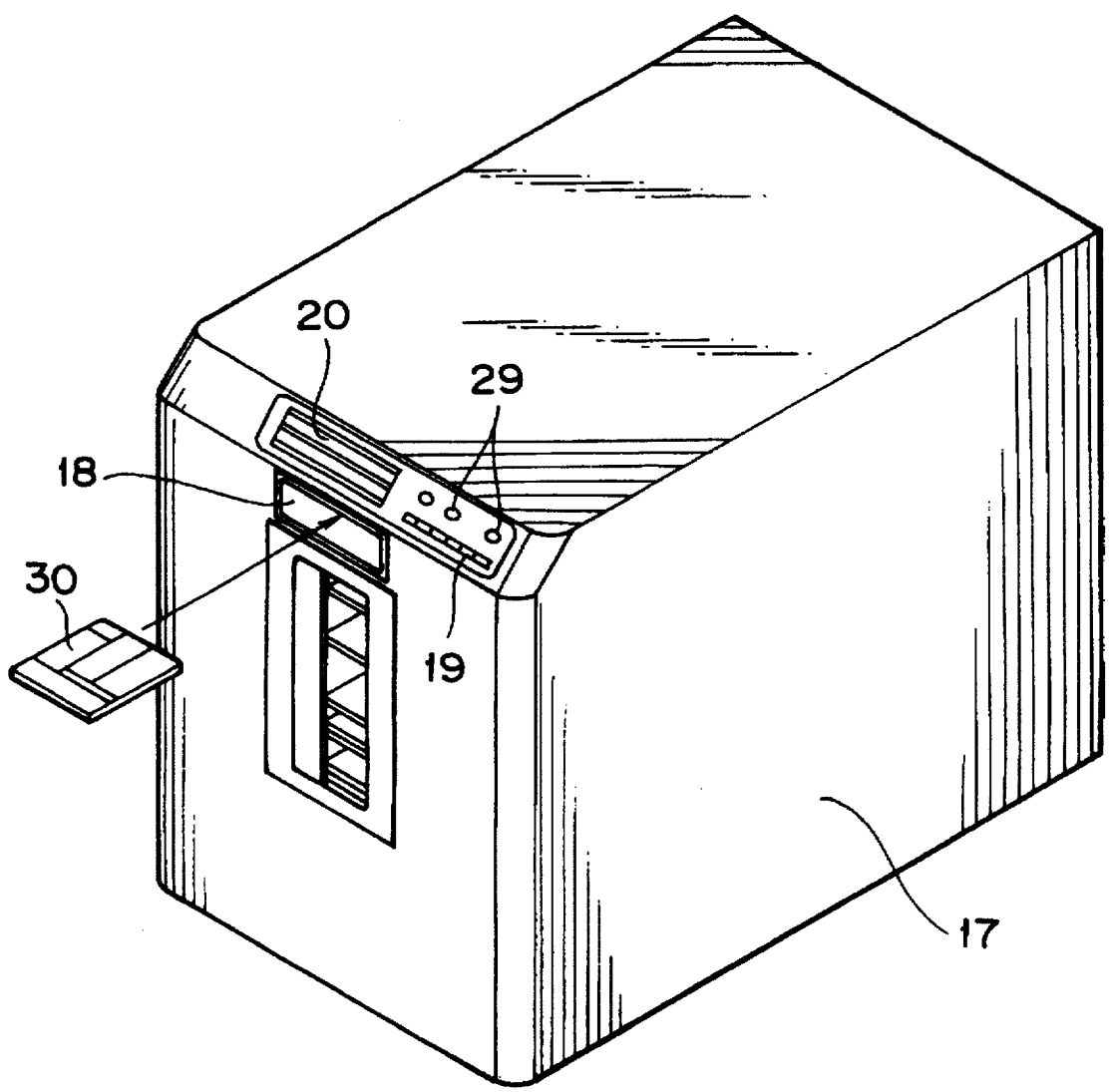
FIG. 2 is an exterior perspective view of an optical disk library apparatus.

As illustrated in FIG. 2, a cartridge entry/eject slot 18 is formed in a front portion of a housing 17 of an optical disk library apparatus. And a plurality of LEDs 19 and an LCD panel 20 are disposed along a peripheral edge portion of the cartridge entry/eject slot 18. An optical disk cartridge 30 is entered into the optical disk library apparatus from the cartridge entry/eject slot 18.

Figure 3:
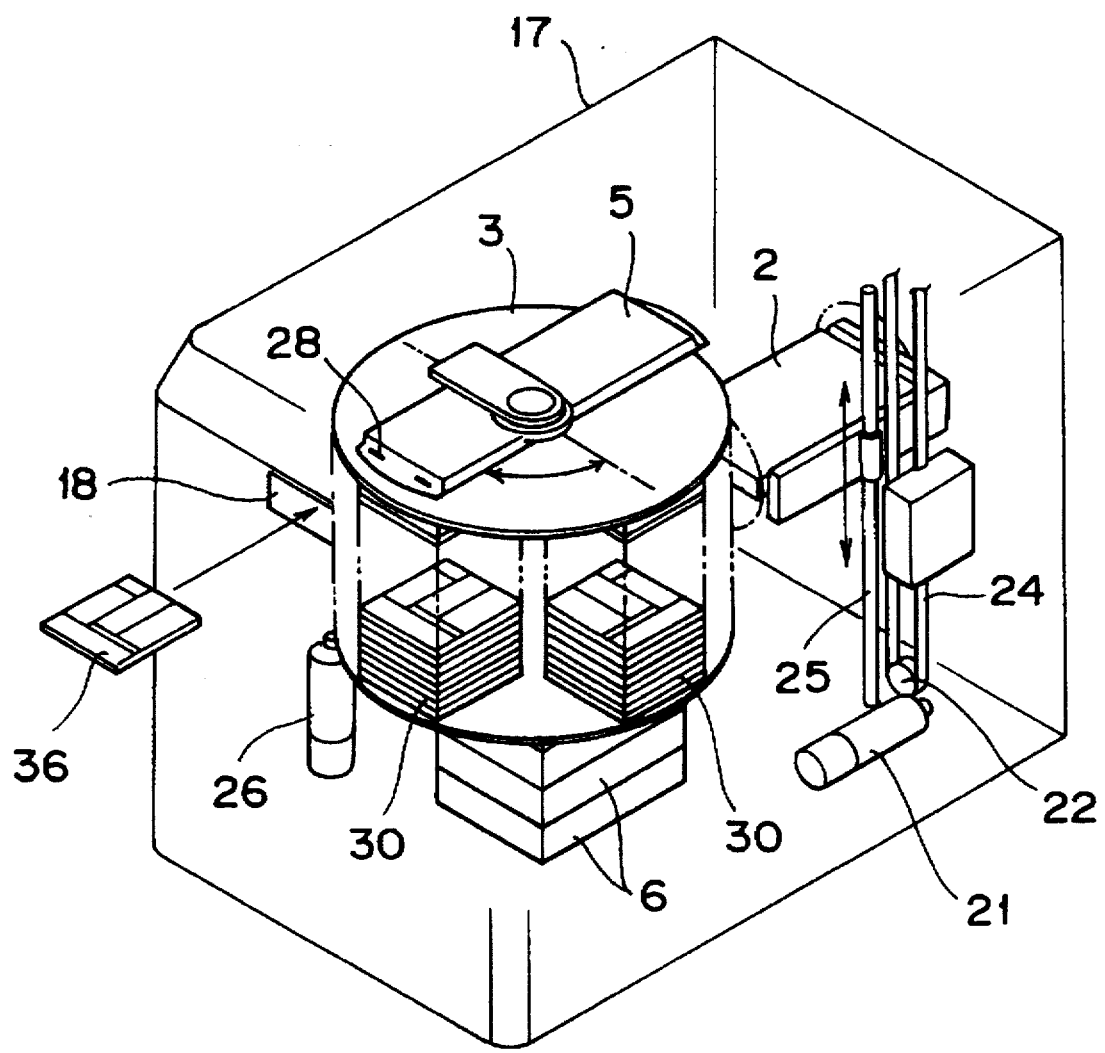
FIG. 3 is a perspective view of an optical disk library apparatus equipped with an ID hole sensor.
Figure 4:
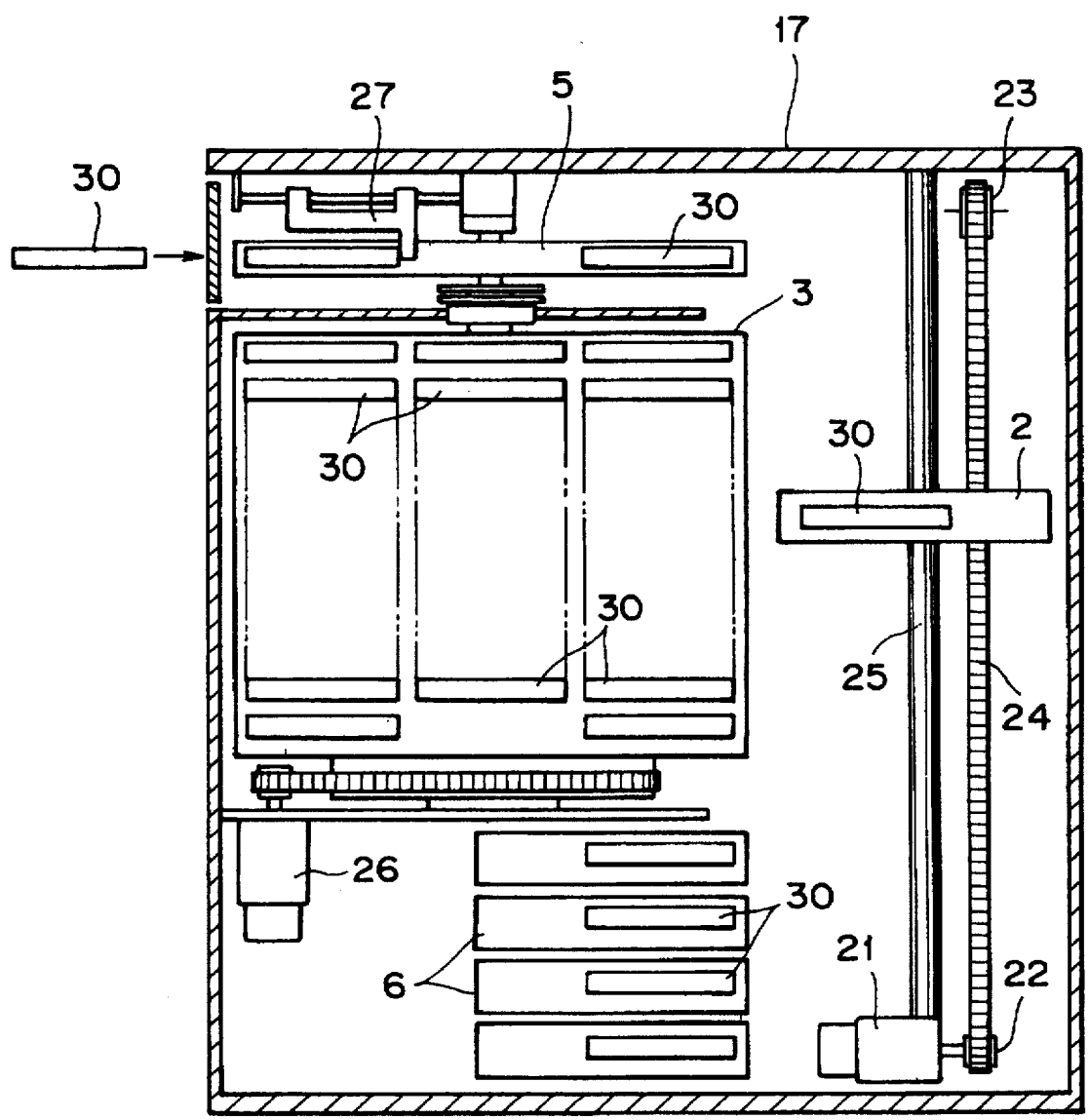
FIG. 4 is a sectional view of an optical disk library apparatus.

Referring now to FIGS. 3 and 4, a cell drum 3 having a plurality of cells and a cartridge access station 5 are incorporated rotatably in the housing 17. The cell drum 3 and the cartridge access station 5 are disposed concentrically with each other and are both rotated by a motor 26. In the housing 7, there are also incorporated a plurality of optical disk drive units 6 and an accessor 2 for carrying a cartridge among the cell drum 3, the cartridge access station 5 and the drive units 6.

A timing belt 24 is wound around a pulley 22 fixed to an output shaft of a motor 21 and another pulley 23 attached rotatably to the housing 17, and the accessor 2 is fixed to the timing belt 24. When the motor 21 is rotated, the accessor 2 is displaced vertically along a guide shaft 25. The cell drum 3 has a multiplicity of cells, each of which is capable of holding one optical disk cartridge 30 therein. And a cleaning cartridge is held in a specific one of such multiple cells.

The cartridge access station 5 carries an optical disk cartridge, which is entered from the outside by an operator, up to a position of transfer to the accessor 2, or receives a used cartridge from the accessor 2 and carries it to a predetermined position to eject the same to the outside through the cartridge entry/eject slot 18. The cartridge access station 5 is equipped with an ID hole sensor 28 consisting of a transmissive optical sensor or the like and detects a cleaning cartridge 36 entered into the cartridge access station 5. (The cleaning cartridge 36 will be described in detail later.)

The plurality of LEDs 19 display states of the apparatus (power on/off, on line, busy) and an alarm. The LEDs 19 are blinked for informing the operator of a head cleaning mode or a cleaning cartridge replacement time. And the LCD panel 20 displays some messages inclusive of the head cleaning mode and the cleaning cartridge replacement time.

When the operator enters the optical disk cartridge 30 from the cartridge entry/eject slot 18, the cartridge 30 is brought into contact with a stopper 27 of the cartridge access station 5. Then the motor 26 is driven to rotate the cartridge access station 5 by 180° together with the cell drum 3 and delivers the cartridge to the accessor 2. Upon reception of the optical disk cartridge, the accessor 2 carries the cartridge to insert the same into the designated cell of the cell drum 3.

In performing a data recording or reproducing operation on the optical disk cartridge, the accessor 2 takes out the cartridge from the designated cell of the cell drum 3 and then carries and inserts the cartridge into the designated drive unit 6. Upon completion of the data recording or reproduction on the medium of the optical disk cartridge, the accessor 2 takes out the cartridge from the drive unit 6 and then carries and inserts the cartridge into the designated cell of the cell drum 3.

In ejecting the used optical disk cartridge to the outside, the accessor 2 takes out the cartridge from the designated cell of the cell drum 3 and carries the cartridge to transfer the same to the cartridge access station 5. Subsequently the motor 26 is driven to rotate the cartridge access station 5 by 180°, thereby ejecting the cartridge to the outside from the cartridge entry/eject slot 18.

Figure 5A:
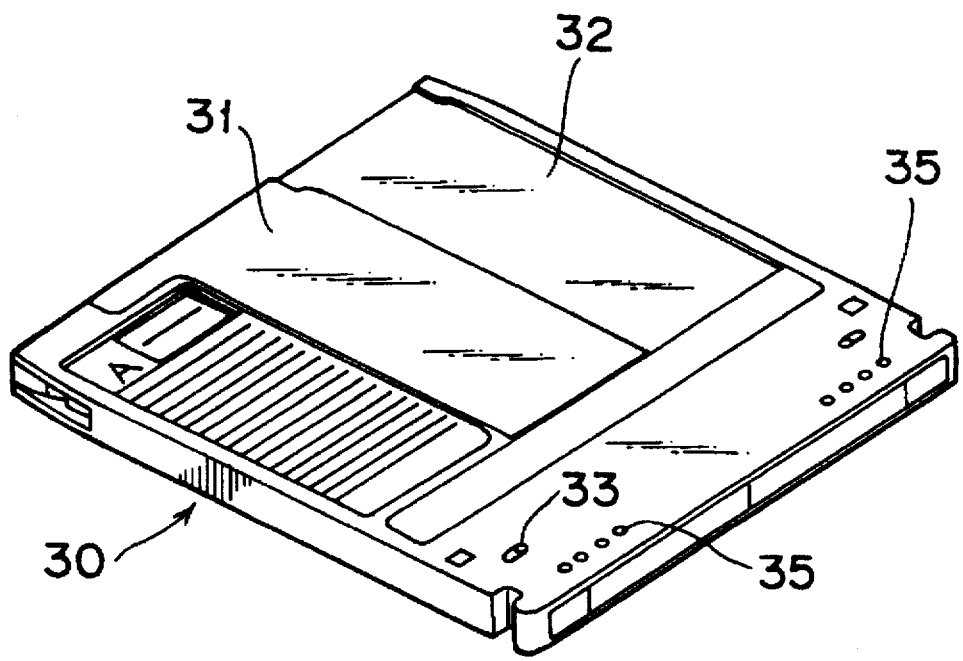
FIG. 5A is a perspective view of an optical disk cartridge with a shutter thereof closed.
Figure 5B:
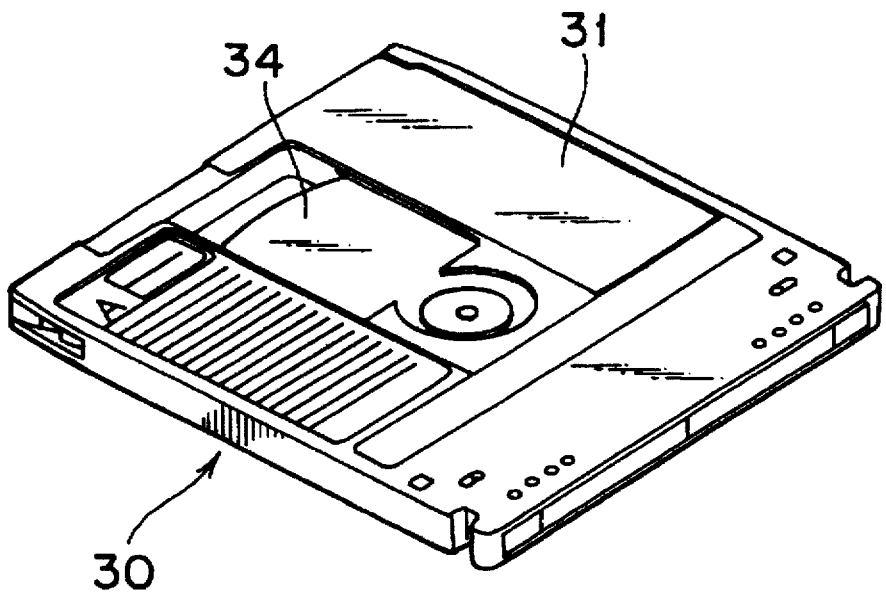
FIG. 5B is a perspective view of an optical disk cartridge with a shutter thereof opened.
Figure 6A:
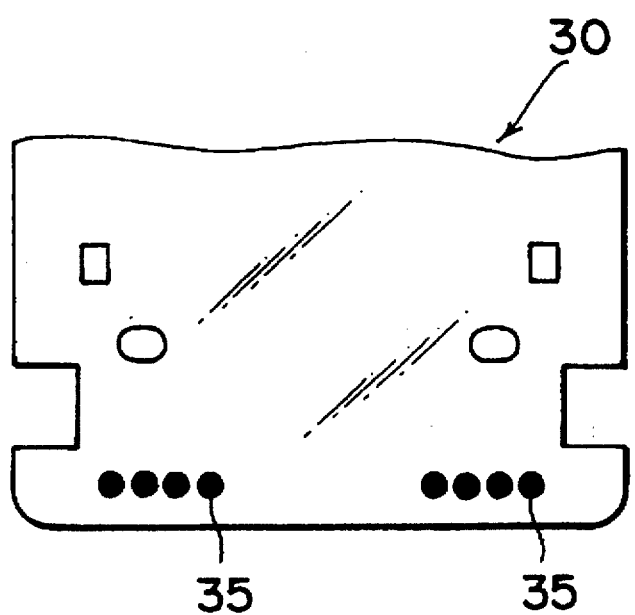
FIG. 6A is an explanatory diagram of an optical disk cartridge.
Figure 6B:
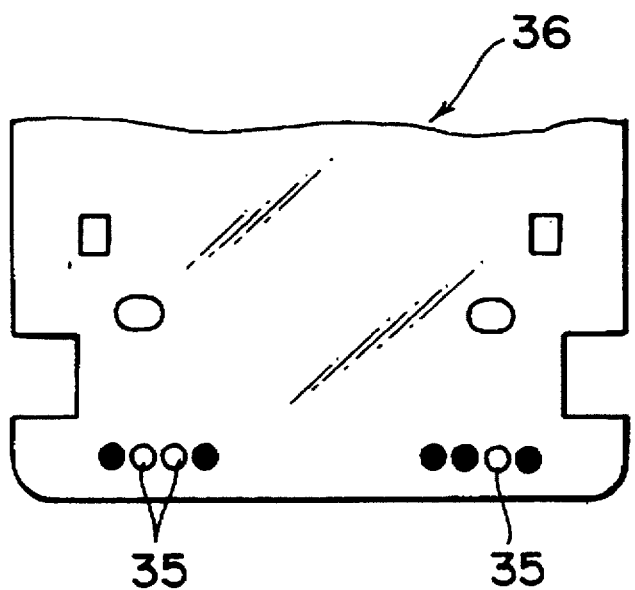
FIG. 6B is an explanatory diagram of a cleaning cartridge.

FIG. 5A is a perspective view illustrating an optical disk cartridge with a shutter thereof closed, and FIG. 5B is another perspective view illustrating the same cartridge with the shutter thereof opened. FIGS. 6A and 6B schematically show an optical disk cartridge 30 and a cleaning cartridge 36, respectively.

The optical disk cartridge 30 comprises a disk medium 34 and a cartridge case 32 for housing the disk medium 34 therein. The cartridge case 32 has a shutter 31, a write protector 33 and a plurality of ID holes 35. The shutter 31 is formed so as to be movable on the cartridge case 32, and it is normally closed so that the disk medium 34 is held in the cartridge case 32. When the optical disk cartridge 30 is inserted into the drive unit 6, the shutter 31 is opened to expose the disk medium 34, whereby a data read/write operation is rendered possible by an optical head.

The cleaning cartridge employed to clean the optical head of each drive unit is externally the same in construction as an ordinary optical disk cartridge. More specifically, although not containing a disk medium 34, the cleaning cartridge 36 is substantially the same in both structure and dimensions as the ordinary optical disk cartridge 30. Therefore, in order to enable the drive unit itself to detect that any cartridge inserted into the drive unit is an ordinary cartridge or a cleaning cartridge, ID holes 35 (four on either side) are formed in the cartridge. This identification is executed in the cartridge access station 5 as well by means of an ID hole sensor 28.

For the purpose of executing such identification, the ID holes 35 in each ordinary optical disk cartridge 30 are entirely closed (as denoted by black circles in FIG. 6A), whereas some of the ID holes 35 in the cleaning cartridge 36 are left open (as denoted by white circles in FIG. 6B). Consequently, in the cartridge access station 5 and the drive unit 6, discrimination between the ordinary optical disk cartridge and the cleaning cartridge can be realized by detecting such ID holes by means of the sensor. The cleaning cartridge 36 has a cleaning brush in a portion of a rotator which corresponds to the disk medium in the optical disk cartridge 30. And head cleaning is performed by rubbing an objective lens of the optical head with such a cleaning brush.

Figure 7A:
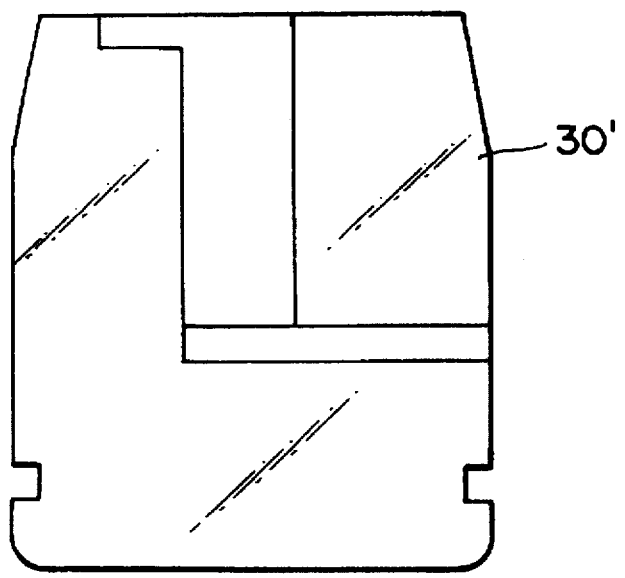
FIG. 7A is a plan view of an optical disk cartridge of another type.
Figures 7B, 7C:
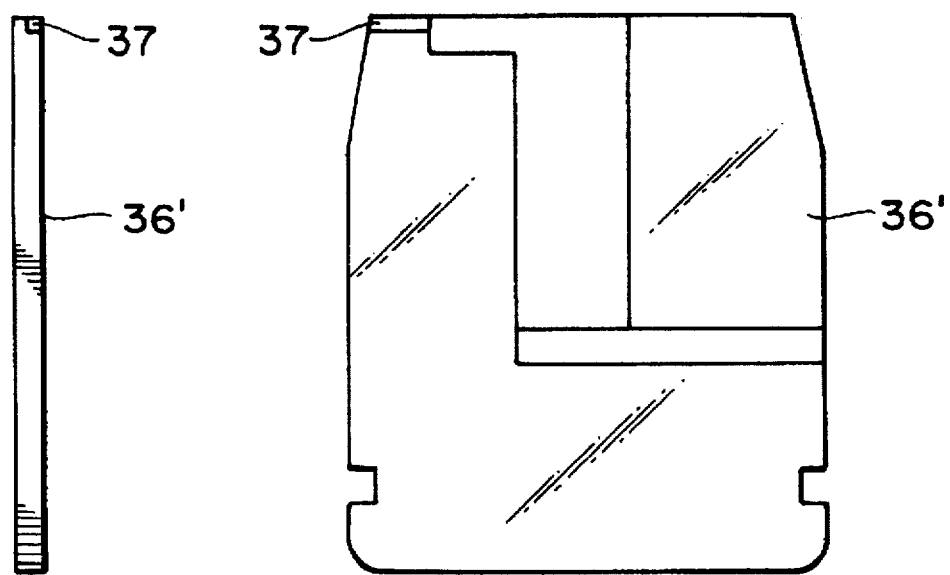
FIG. 7B is a plan view of a cleaning cartridge of another type.
FIG. 7C is a side view of the cleaning cartridge shown in FIG. 7B.
Figure 8:
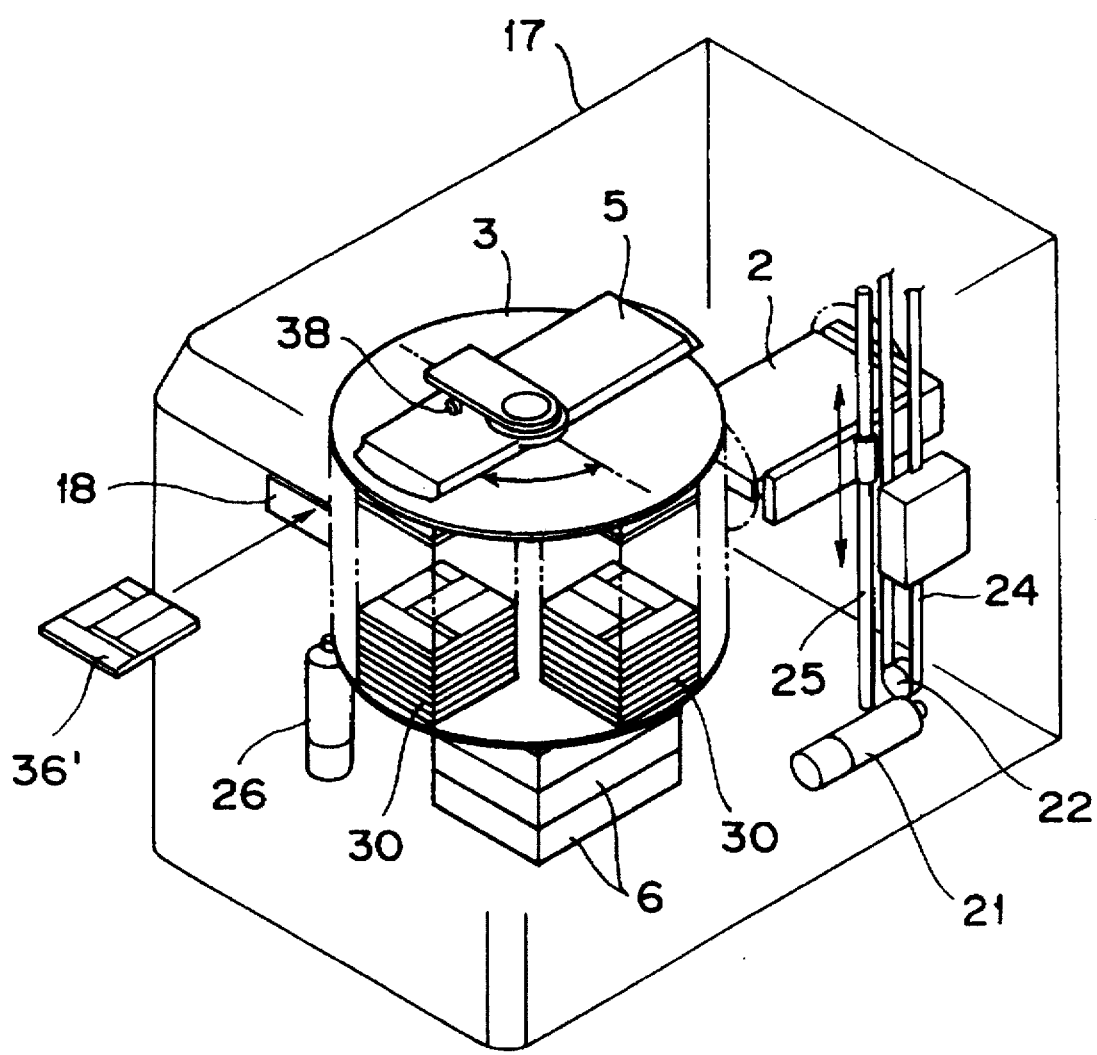
FIG. 8 is a perspective view of an optical disk library apparatus equipped with a cleaning-cartridge discriminating sensor.

FIG. 7A is a plan view of an optical disk cartridge 30' of another type, and FIGS. 7B and 7C are a plan view and a side view, respectively, of a cleaning cartridge 36' which is similar in shape to the optical disk cartridge 30'. The cleaning cartridge 36' has a recess 37 in a portion of its upper face and is discriminated from an optical disk cartridge by a cleaning cartridge discriminative sensor 38 provided in the cartridge access station 5 as illustrated in FIG. 8.

Figure 9:
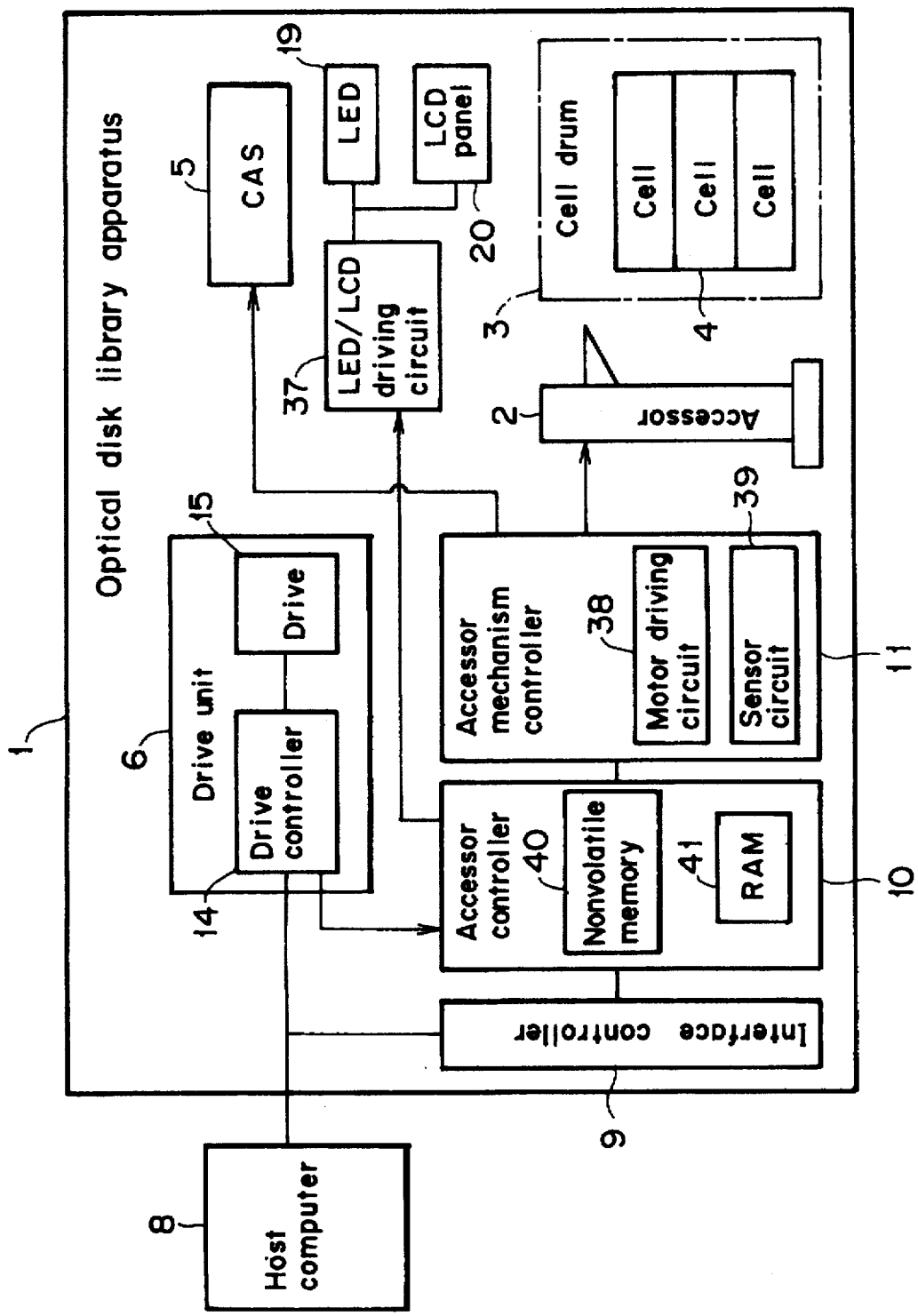
FIG. 9 is a block diagram of a control system for an optical disk library apparatus.

Now a control system for the optical disk library apparatus will be described below with reference to FIG. 9. The control system for the optical disk library apparatus comprises an interface controller 9, an accessor controller 10, an accessor mechanism controller 11 and an LED/LCD driving circuit 37. The accessor controller 10 has a nonvolatile memory 40 and a RAM 41, while the accessor mechanism controller 11 has a motor driving circuit 38 and a sensor circuit 39.

Each of the drive units 6 comprises an optical disk drive 15 and a drive controller 14 for controlling the optical disk drive 15. The interface controller 9 and the drive controller 14 are connected to the host computer 8. The nonvolatile memory 40 stores a numerical value indicating the number of times of using the cleaning cartridge, a head cleaning request flag relative to each drive unit, and information representing the presence or absence of an optical disk cartridge in each drive unit. And the RAM 41 stores information representing the presence or absence of a cartridge in each cell 4.

Figure 24:
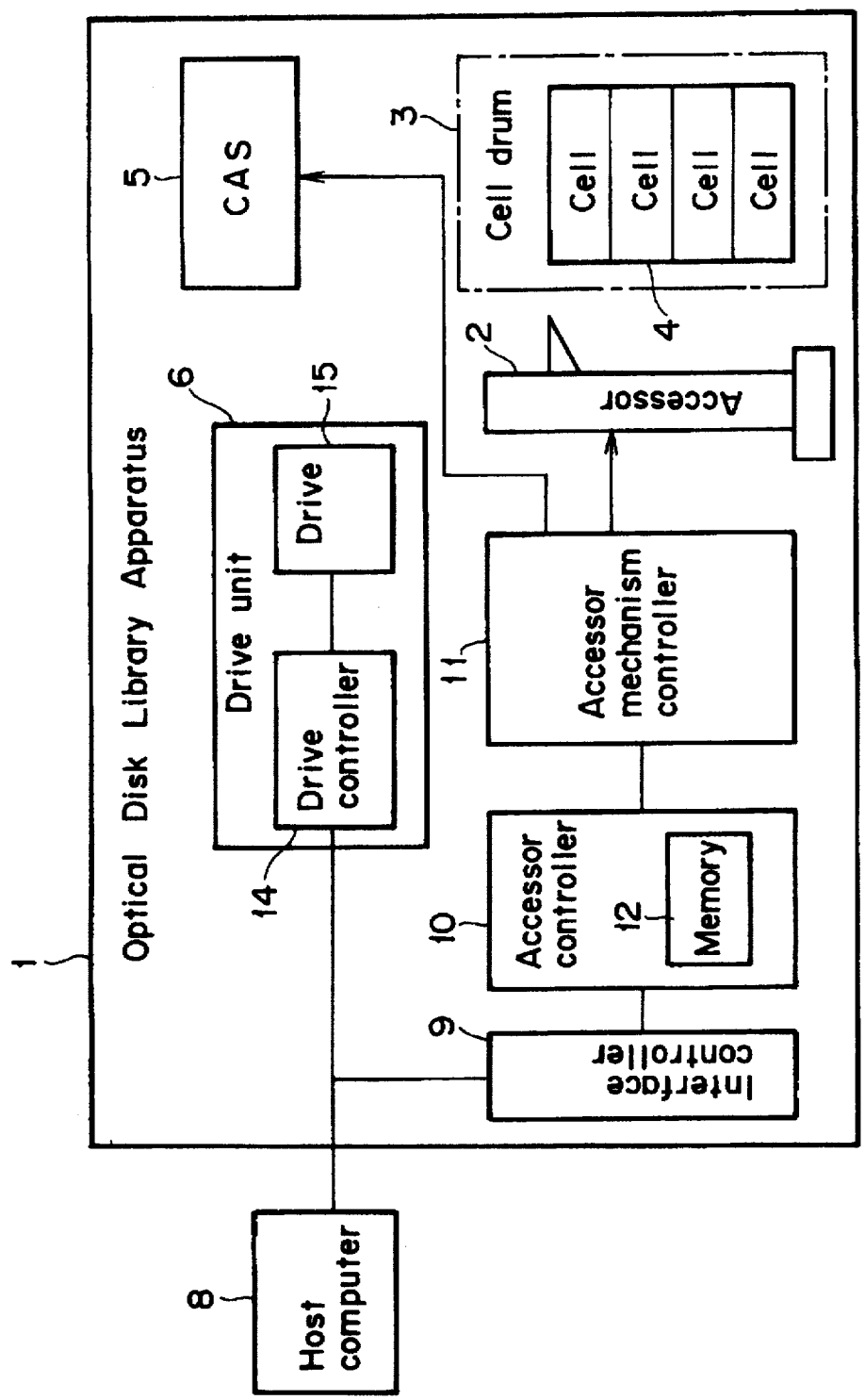
FIG. 24 is a block diagram of a control system for the conventional optical disk library apparatus.
Figure 25:
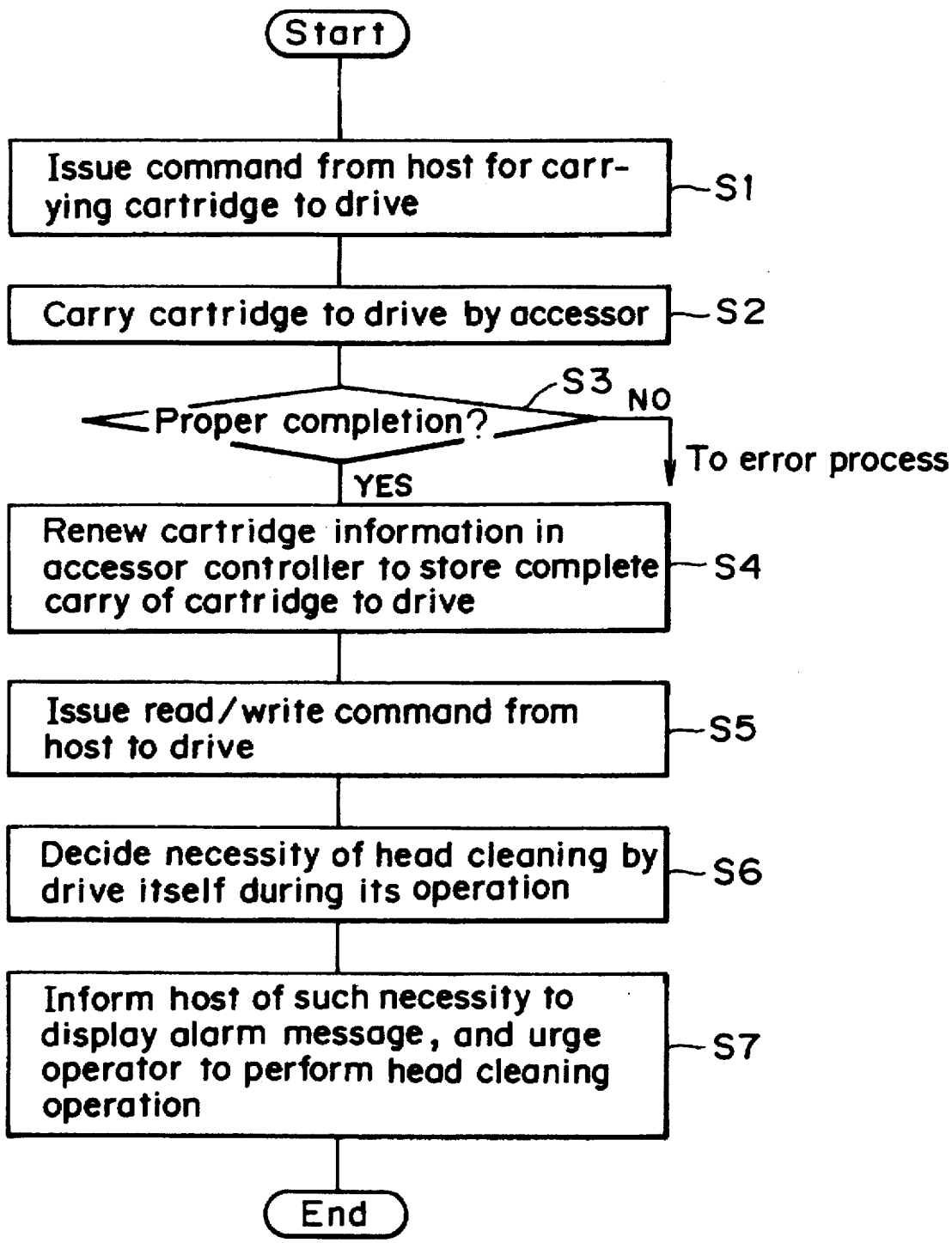
FIG. 25 is a flow chart of a cleaning procedure executed in the conventional apparatus.

The LED/LCD driving circuit 37 serves to drive the LEDs 19 and the LCD panel 20 under control of the accessor controller 10. Meanwhile the motor driving circuit 38 serves to drive the motor 21 of the accessor 2 and the motor 26 of the cell drum 3 under control of the accessor controller 10. And the sensor circuit 39 detects sensor output signals of the accessor 2 and the cartridge access station 5. Since the constitution of the control system is the same as that of the conventional example shown in FIG. 24, a repeated explanation thereof is omitted here. Furthermore, the data read/write operation of the optical disk library apparatus in its normal running state is also the same as that of the aforementioned conventional example. Therefore a repeated explanation is omitted here.

Figure 10A:
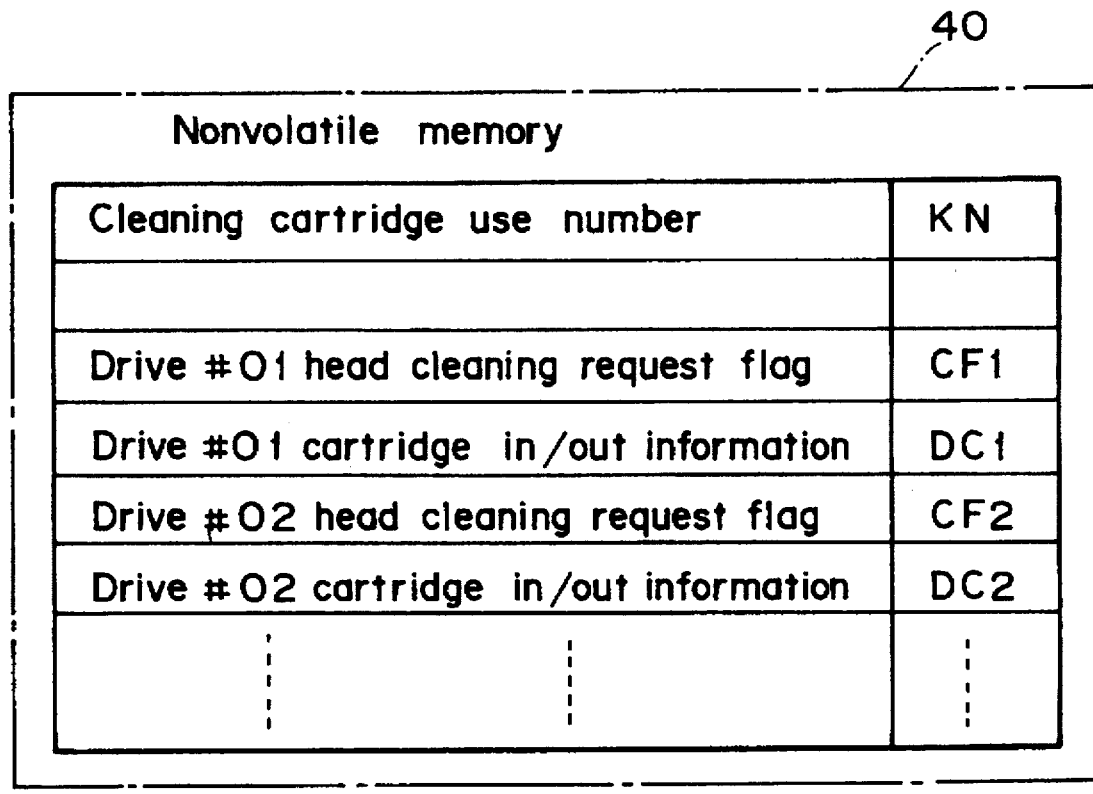
FIG. 10A shows exemplary information stored in a nonvolatile memory.
Figure 10B:
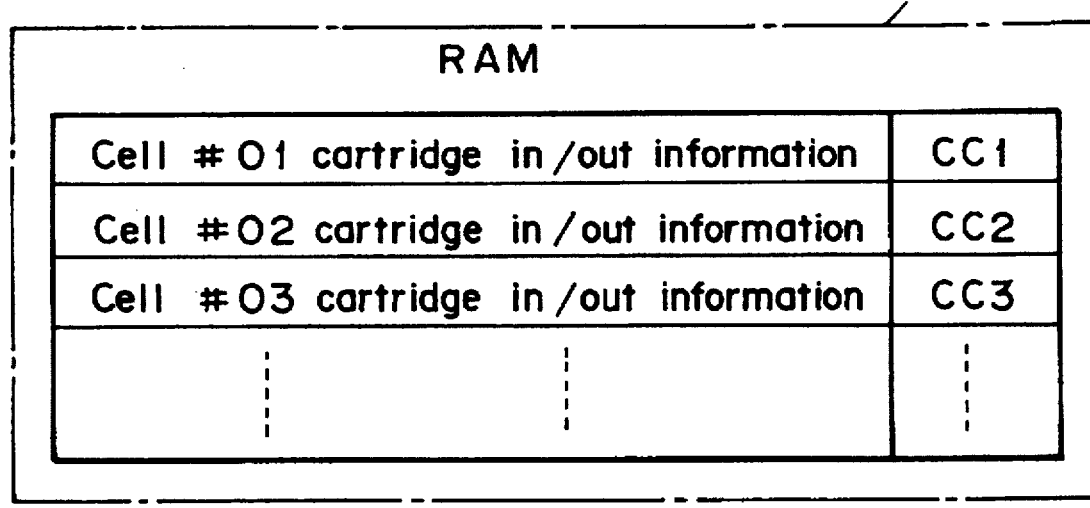
FIG. 10B shows exemplary information stored in a RAM.

Referring now to FIGS. 10A and 10B, a description will be Given on the information stored in the nonvolatile memory 40 and the RAM 41. FIG. 10A shows the information stored in the nonvolatile memory 40 provided in the accessor controller 10. The information includes a cleaning cartridge use number KN, a drive #01 head cleaning request flag CF1, drive #01 cartridge in/out information DC1, a drive #02 head cleaning request flag CF2, drive #02 cartridge in/out information DC2 and so forth.

Immediately after replacement of the cleaning cartridge, a numerical value KN indicating the total number of times of using the cleaning cartridge is zero (KN=0). And this numerical value is increased by one (KN+1) every time a head cleaning operation is performed by using the cleaning cartridge. A head cleaning request flag is normally in an off-state (flag=0), and in response to a head cleaning request signal outputted from a drive unit, the flag is turned to an on-state (flag=1).

As for the cartridge in/out information, "0" is stored if an optical disk cartridge is out or not present in a drive unit, or "1" is stored if an optical disk cartridge is present therein. The information stored in the RAM 41 of the accessor controller 10 includes, as shown in FIG. 10B, cell #01 cartridge in/out information CC1, cell #02 cartridge in/out information CC2 and so forth. Such information is set correspondingly to each cell 4 of the cell drum 3, and "0" is stored if an optical disk cartridge is out or not present in a cell 4, or "1" is stored if an optical disk cartridge is present therein.

Figure 11:
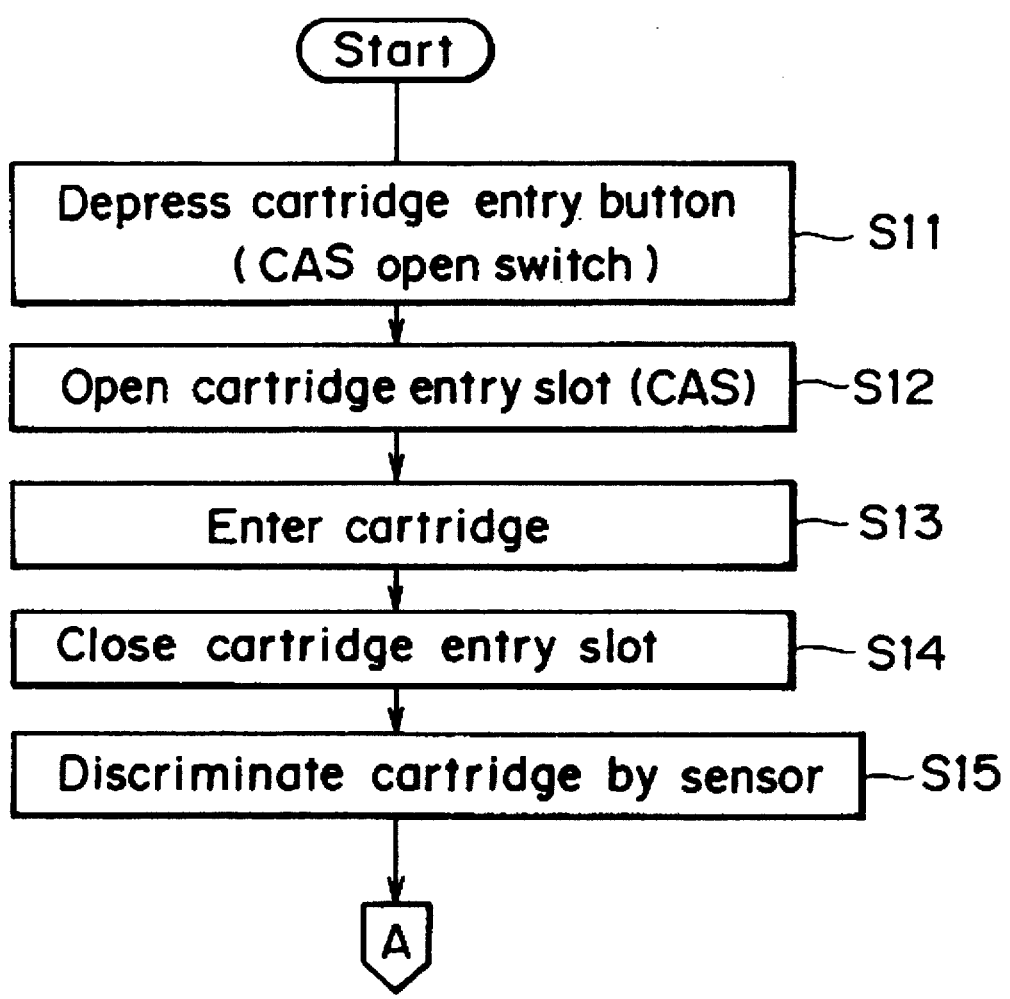
FIG. 11 is a flow chart of a procedure for decision of a cleaning cartridge.

Referring next to a flow chart of FIG. 11, a description will be given on a procedure of making a decision as to whether any entered cartridge is a cleaning cartridge or not. First, when a cartridge entry button (CAS open switch) is depressed at step 11, a cover disposed on the cartridge entry slot 18 is opened at step 12. Normally the cover is locked at its closed position, and when the cartridge entry button is depressed, the cover is unlocked to be thereby opened. After the cover is thus opened, an operator enters a cartridge into the cartridge entry slot 18 at step 13, and subsequently closes the cover of the cartridge entry slot 18 at step 14.

Upon insertion of the cartridge into the cartridge access station 5, the ID hole sensor 28 shown in FIG. 3 or the cartridge discriminative sensor 38 shown in FIG. 8 makes a decision, at step 15, as to whether the inserted cartridge is an ordinary optical disk cartridge or the cleaning cartridge in accordance with the type thereof. Consequently the accessor 2 is enabled to identify that the entered cartridge is an ordinary optical disk cartridge or the cleaning cartridge.

Figure 12:
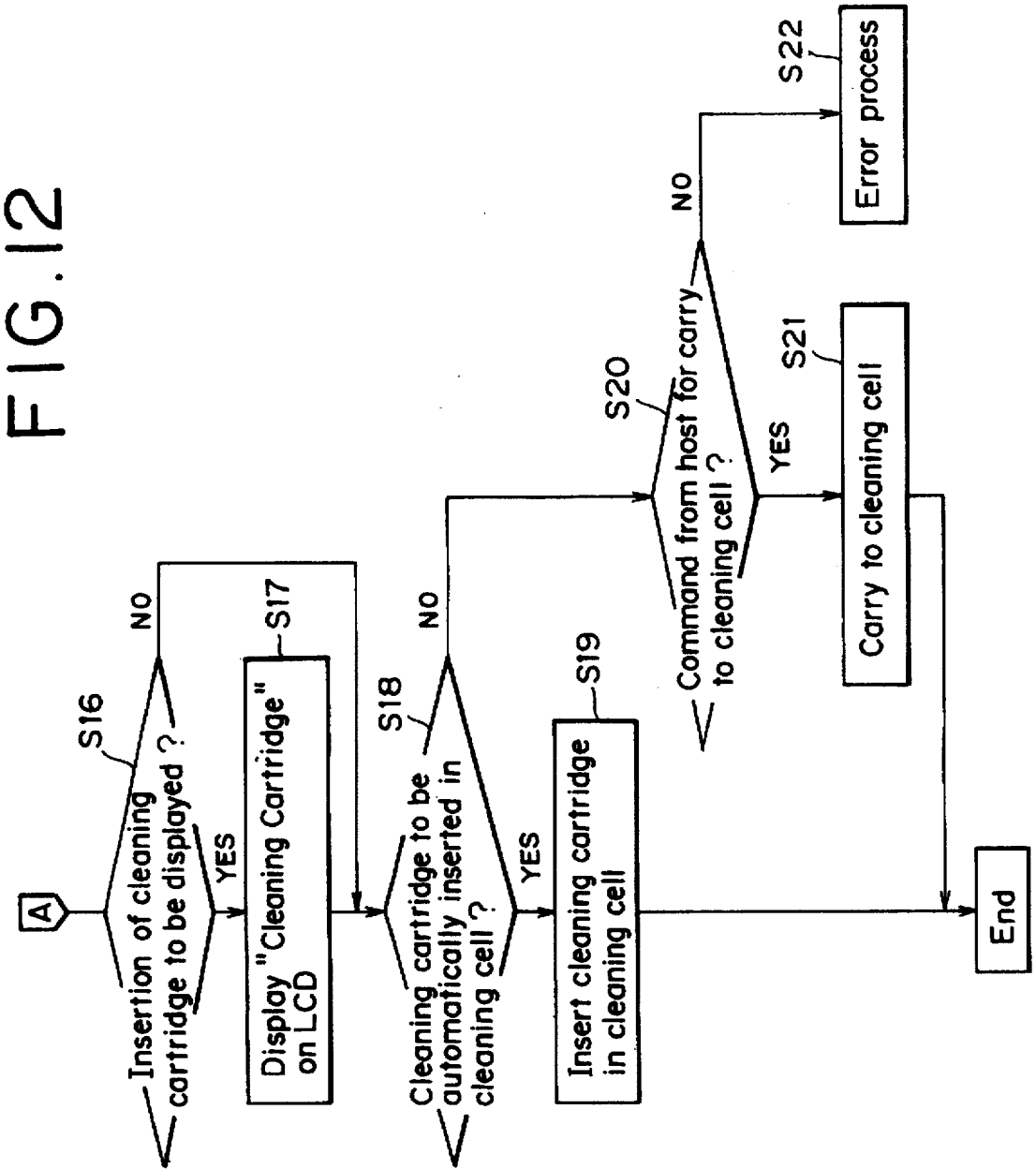
FIG. 12 is a flow chart of a procedure for carrying a cleaning cartridge.

Now a procedure of carrying the cleaning cartridge will be described below with reference to a flow chart of FIG. 12. First at step 16, a decision is made as to whether insertion of the cleaning cartridge is to be displayed or not on the LCD panel 20. If the result of such a decision is affirmative, the procedure advances to step 17, where "cleaning cartridge" is displayed on the LCD panel 20.

In case the result of the decision at step 16 is negative, the procedure advances to step 18 after completion of the process at step 17, and a decision is made as to whether the cleaning cartridge is to be held automatically in a predetermined cleaning cell in the cell drum 3. If the result of this decision is affirmative, the procedure advances to step 19, where the accessor 2 receives the cleaning cartridge from the cartridge access station 5 and carries the cartridge to hold the same in the predetermined cleaning cell.

In case the result of the decision at step 18 is negative, the procedure advances to step 20, where a decision is made as to whether a carry command from the host computer signifies a carry to the cleaning cell or not. If the result is affirmative, the procedure advances to step 21, where the accessor 2 carries the cleaning cartridge to the cleaning cell and holds the same therein. Meanwhile, if the result of the decision is negative, the procedure advances to step 22, where an error is reported to the host computer 8.

At steps 16 and 18, selection of either YES or NO can be manually inputted by manipulating a function key 29 disposed on the front panel. The procedure is normally programmed that insertion of the cleaning cartridge is displayed on the LCD 20 at step 16, and the cleaning cartridge is automatically held in the cleaning cell at step 18. Due to the provision of a decision process at step 20, even if the operator erroneously inserts the cleaning cartridge into the cartridge entry slot 18 instead of an ordinary disk cartridge, an error is reported to the host computer 8 at step 22 so that such an error can be processed properly.

Figure 13:
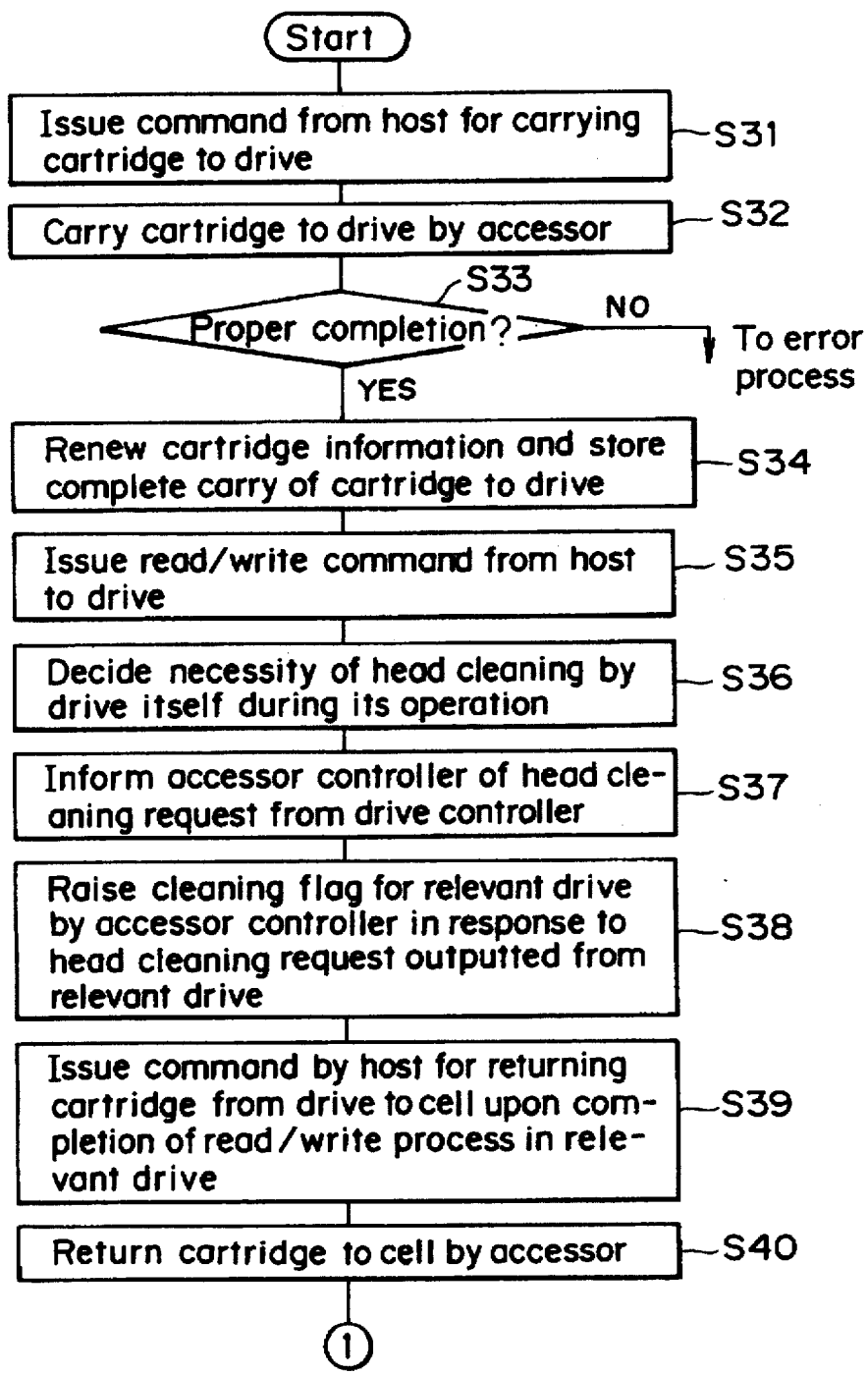
FIGS. 13 to 15 show a flow chart of an entire procedure executed in an embodiment of the present invention.

Referring now to a flow chart of FIGS. 13 to 15, a description will be given on the entire procedure executed in the embodiment of the present invention. First at step 31, the host computer 8 issues a command for carrying an optical disk cartridge to the drive unit 6. This command is analyzed by the interface controller 9, and the result of such analysis is inputted to the accessor controller 10. Then the accessor controller 10 calculates, on the basis of the input result, the arrival position of the optical disk cartridge to be carried and the required displacement distance of the accessor 2, and sends an instruction (motor driving control signal) to the accessor mechanism controller 11. Subsequently, in response to this instruction, the accessor mechanism controller 11 drives the motor of the accessor 2 to thereby actuate the accessor 2.

When the motor is thus driven, the accessor 2 takes out the optical disk cartridge from the cell 4 at the designated position and carries the cartridge up to the position of the designated drive unit 6, as shown at step 32. Further the accessor 2 inserts the optical disk cartridge from the cartridge inlet opening formed in the drive unit 6, whereby the optical disk cartridge is loaded in the drive unit 6 and is placed in a standby state ready for data recording and/or reproduction.

At step 33, the accessor controller 10 makes a decision as to whether the process at step 32 has been properly completed or not. If the result of such a decision signifies that the cartridge has not been properly carried by the accessor 2, the accessor controller 10 reports an error to the host computer 8 via the interface controller 9. In case the result of the decision at step 33 signifies proper completion of the process, the procedure advances to step 34, where the accessor controller 10 renews internal cartridge information (in the nonvolatile memory 40 and the RAM 41) to thereby store the updated information that the optical disk cartridge has been carried to the drive unit 6. In this case, "1" is written in the corresponding bit in the nonvolatile memory 40.

At step 35, the host computer 8 issues a data read or write command to the drive unit 6. Then the drive controller 14 receives this command and analyzes its content. Thereafter the drive controller 14 controls the optical disk drive 15 to read the data from the disk medium or to write thereon the data transferred from the host computer 8.

During the data read/write operation, the drive controller 14 of the drive unit 6 makes a decision as to whether head cleaning is necessary or not, as shown at step 36. This decision will be described in further detail later. If any head cleaning is not necessary, the drive unit 6 performs its normal operation to complete the process. Suppose now that the result of the decision by the drive controller 14 signifies that head cleaning is necessary.

When the drive controller 14 decides the necessity of head cleaning, the procedure advances to step 37 where the drive controller 14 informs the accessor controller 10 of a head cleaning request by outputting thereto a head cleaning request signal. Then, in response to this head cleaning request signal, the accessor controller 10 raises a head cleaning request flag (i.e., turns the flag bit to "1") in the nonvolatile memory 40 corresponding to the relevant drive unit, as shown at step 38. For example, when a head cleaning request signal is outputted with respect to the drive unit #01, the head cleaning request flag in the nonvolatile memory 40 corresponding to the drive unit #01 is turned to "1".

Upon completion of the data read/write process, a process end report is sent from the drive controller 14 to the host computer 8, as shown at step 39. Then the host computer 8 confirms the completion of the read/write process in response to such a report and issues a command for returning the inserted optical disk cartridge from the drive unit 6 back to the cell 4. This command is received by the interface controller 9 where the content thereof is analyzed, and the result of such analysis is inputted to the accessor controller 10. And subsequently, on the basis of this result, the accessor controller 10 detects the arrival position of the optical disk cartridge to be carried and calculates the required displacement distance of the accessor 2.

Under control of the accessor controller 10, the motor driving circuit 38 in the accessor mechanism controller 11 drives the motor of the accessor 2 to thereby cause a vertical displacement of the accessor 2. And then, as shown at step 40, the accessor 2 takes out a cartridge from the designated drive unit and carries the cartridge to insert it into the desired target cell.

Figure 14:
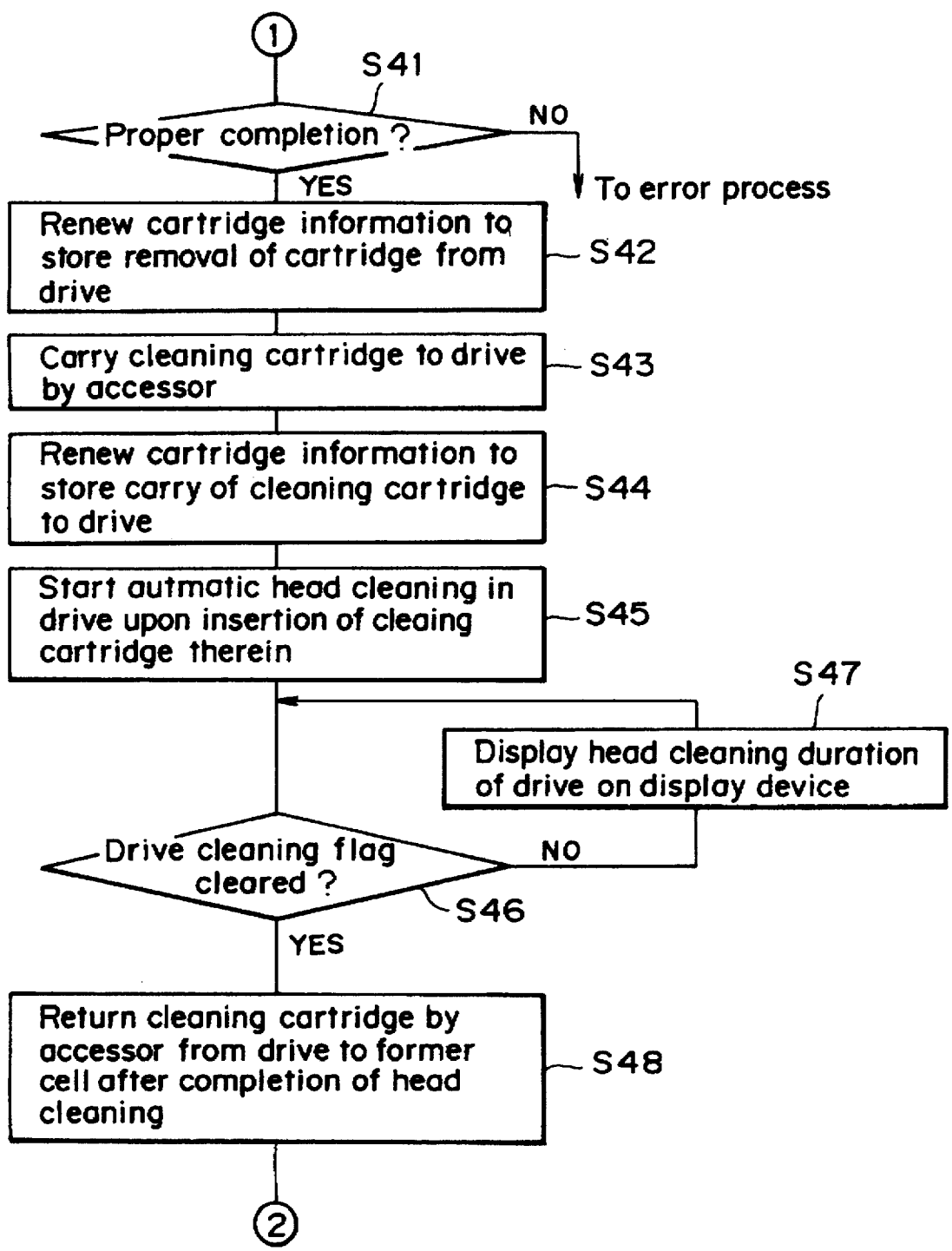
Figure 15:
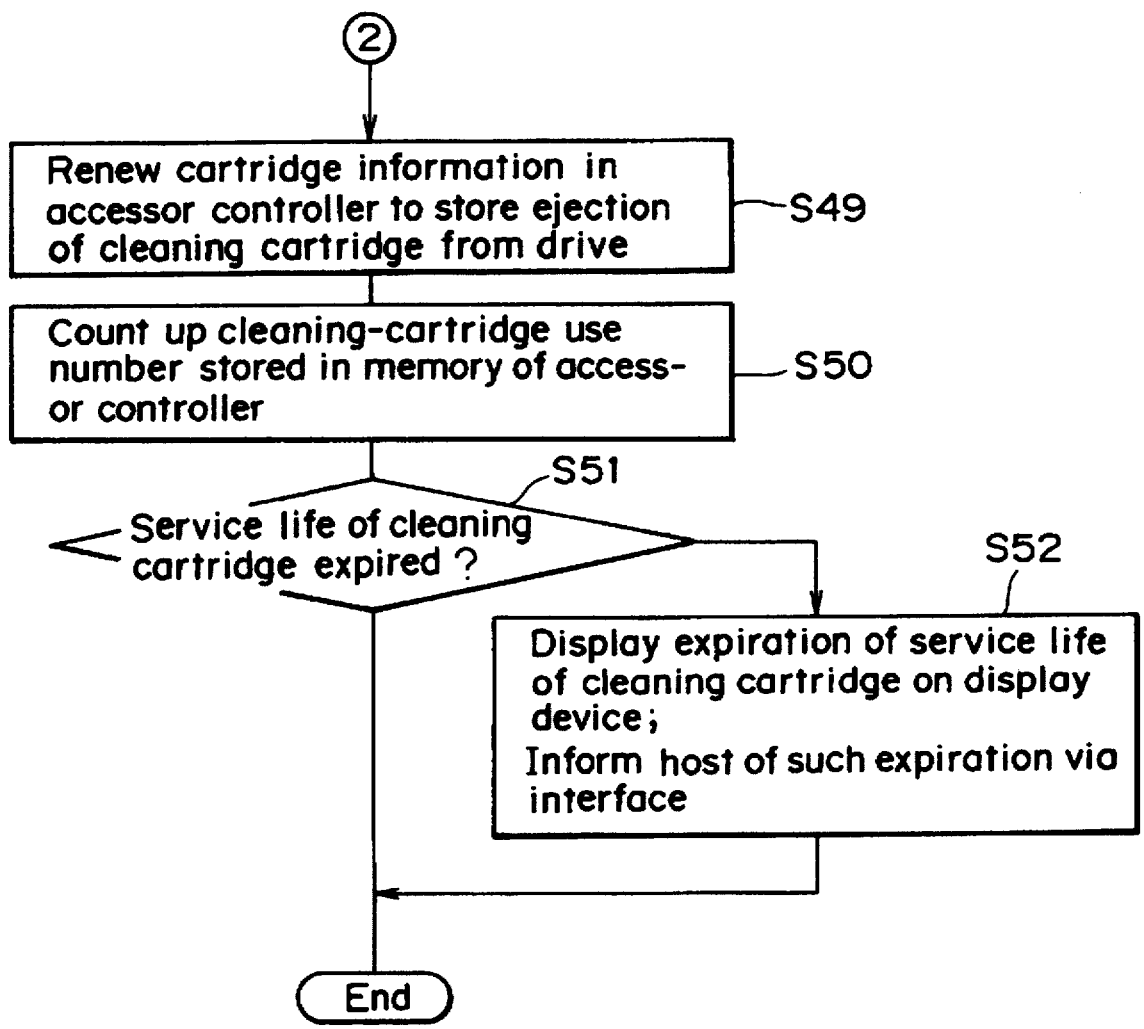

Thereafter the procedure advances to step 41 in FIG. 14, where the accessor controller 10 makes a decision as to whether the process at step 40 has been properly completed or not. If the result of such a decision signifies no of proper completion, an error process is executed. More specifically, the sensor circuit 39 detects a signal outputted from a sensor provided in the accessor 2, and the accessor controller 10 confirms an abnormal state on the basis of the result of such detection. And subsequently the accessor controller 10 sends an error report to the host computer 8 via the interface controller 9.

When the result of the decision at step 41 is affirmative, the procedure advances to step 42, where the accessor controller 10 renews the internal cartridge information (in the nonvolatile memory 40 and the RAM 41) to store that the optical disk cartridge has been drawn out from the drive unit 6. At step 43, the accessor 2 is driven under control of the accessor controller 10 and, after taking out the cleaning cartridge from the specific cell 4, the accessor 2 carries the cleaning cartridge to insert it into the desired target drive unit 6.

At step 44, the accessor controller 10 renews the internal cartridge information to store that the cleaning cartridge has been carried to the drive unit 6. Upon insertion of the cleaning cartridge, the drive unit 6 automatically starts a head cleaning operation at step 45. Subsequently at step 46, the accessor controller 10 makes a decision, on the basis of the information from the drive controller 14, as to whether the head cleaning has been completed or not by the drive unit. If the result of such a decision signifies completion of the head cleaning, the drive controller 14 sends a head-cleaning end notice to the accessor controller 10.

At step 47, the accessor controller 10 controls the LED/LCD driving circuit 37 during the period of time from the start to the end of the head cleaning in the drive unit 6, and displays on the LCD panel 20 a message which indicates that the head cleaning is being performed now. And simultaneously therewith, the accessor controller 10 causes the LED 19 to blink on and off. After completion of the head cleaning, the procedure advances to step 48 where the accessor controller 10 confirms the end of the cleaning. Subsequently, the accessor 2 is driven by the accessor controller 10 to carry the cleaning cartridge ejected from the drive unit 6, thereby returning the cleaning cartridge to the former cell.

Upon completion of the process at step 48, the accessor controller 10 renews the internal cartridge information to indicate that the cleaning cartridge has been ejected from the drive unit 6 at step 49. Further the accessor controller 10 controls the LED/LCD driving circuit 37 to erase the "head cleaning" message being displayed on the LCD panel 20. Meanwhile the drive unit 6 clears the head cleaning request flag.

At step 50, the accessor controller 10 counts up the numerical value stored in the nonvolatile memory 40 which indicates the total number of times that the cleaning cartridge has been used. Subsequently, at step 51, the accessor controller 10 reads out that numerical value of the cleaning cartridge use number from the nonvolatile memory 40 and compares it with a preset reference value to thereby make a decision as to whether the service life of the cleaning cartridge has expired or not. And if the result of such a decision is negative to signify that the service life of the cleaning cartridge is still left, a normal process is executed.

If the result of the decision at step 51 signifies expiration of the service life of the cleaning cartridge, the procedure advances to step 52, where the accessor controller 10 controls the LED/LCD driving circuit 37 to display on the LCD panel 20 a message which indicates arrival of a replacement time of the cleaning cartridge. And simultaneously therewith, the accessor controller 10 causes the LED 19 to blink on and off. Further the access controller 10 reports arrival of the cleaning cartridge replacement time to the host computer 8 via the interface controller 9. In this manner, the operator and so forth are informed of the time that the cleaning cartridge needs to be replaced.

Figure 16A:
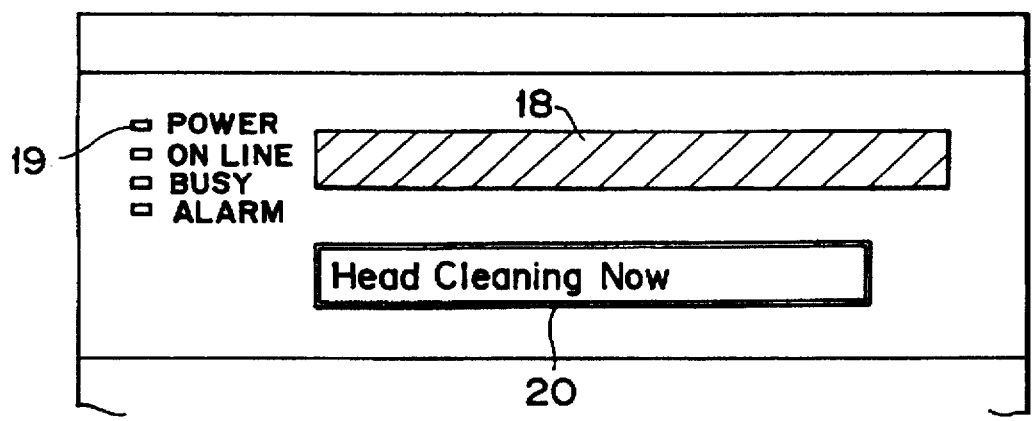
FIG. 16A illustrates a display example of a message signifying "Head Cleaning Now"
Figure 16B:
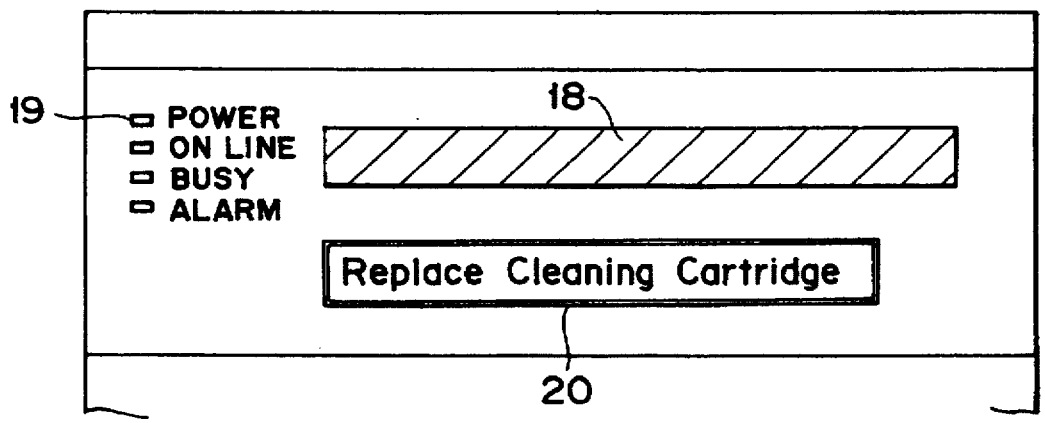
FIG. 16B illustrates another display example of a message signifying "Replace Cleaning Cartridge"

Next, some display examples on the LCD panel will be described below with reference to FIGS. 16A and 16B. FIG. 16A shows a displayed message of "Head Cleaning Now", and FIG. 16B shows another displayed message of "Replace Cleaning Cartridge".

The accessor controller 10 controls the LED/LCD driving circuit 37 during the period of time from the start to the end of the head cleaning operation in the drive unit 6 and, as shown in FIG. 16A, displays on the LCD panel 20 a message which indicates that the head cleaning is being performed now. And simultaneously therewith, the accessor controller 10 causes the alarm LED 19 to blink on and off. Meanwhile, if the result of the decision signifies expiration of the service life of the cleaning cartridge, the accessor controller 10 controls the LED/LCD driving circuit 37 and, as shown in FIG. 16B, displays on the LCD panel 20 a message which indicates the time to replace the cleaning cartridge. And simultaneously therewith, the accessor controller 10 causes the alarm LED 19 to blink on and off.

Referring next to a block diagram of FIG. 17, a description will be given on the construction of the drive unit 6. The drive controller 14 has a RAM 68 and an EEPROM 69. A current-to-voltage converter 45 converts an output current I1 of a semiconductor position detecting element 47 into a voltage. Similarly, a current-to-voltage converter 46 converts an output current I2 of the semiconductor position detecting element 47 into a voltage.

The semiconductor position detecting element 47 detects the position of a positioner 56. A difference circuit 48 calculates the difference between the output of the current to-voltage converter 45 and that of the current-to-voltage converter 46. And another difference circuit 49 calculates the difference between the output of the difference circuit 48 and that of a D-A converter 52. An A-D converter converts an analog signal into a digital signal. And a controller 51 constitutes a portion of the drive controller 14 shown in FIG. 9 and serves to perform various control actions for the drive unit.

The D-A converter 52 converts a digital signal into an analog signal. A phase compensator 53 performs phase compensation for a signal, and a voice coil motor (VCM) driving amplifier 54 serves to drive a VCM coil 58 of the positioner 56. The positioner 56 is actuated for positioning a head, and the VCM coil 58 is energized for driving the positioner 56. A track servo controller 59 is provided for servo-controlling a track actuator of a movable optical head 60 in response to a track error signal which is generated by a fixed optical head 61 on the basis of reflected light obtained from the movable optical head 60.

The movable optical head 60 contains various movable optical parts such as an objective lens, a mirror and an actuator, while the fixed optical head 61 contains various fixed optical parts such as a light emitting element and a light receiving element. A focus servo controller 62 is provided for servo-controlling a focus actuator of the movable optical head 60 in response to a focus error signal which is generated by the fixed optical head 61 on the basis of reflected light obtained from the movable optical head 60.

A read circuit 63 generates a reproduced signal from the optical detection output of the fixed optical head 61 and supplies the signal to the controller 51. Meanwhile a write circuit 64 executes on/off control of a laser diode 65 of the fixed optical head 61 under control of the controller 51. A motor driving circuit 66 drives a spindle motor 67 under control of the controller 51, and the spindle motor 67 rotates an optical disk. A RAM 68 is a memory for storage of a cleaning counter, and an EEPROM 69 is used for storing various parameters with a cleaning counter and a cleaning flag.

Figure 18:
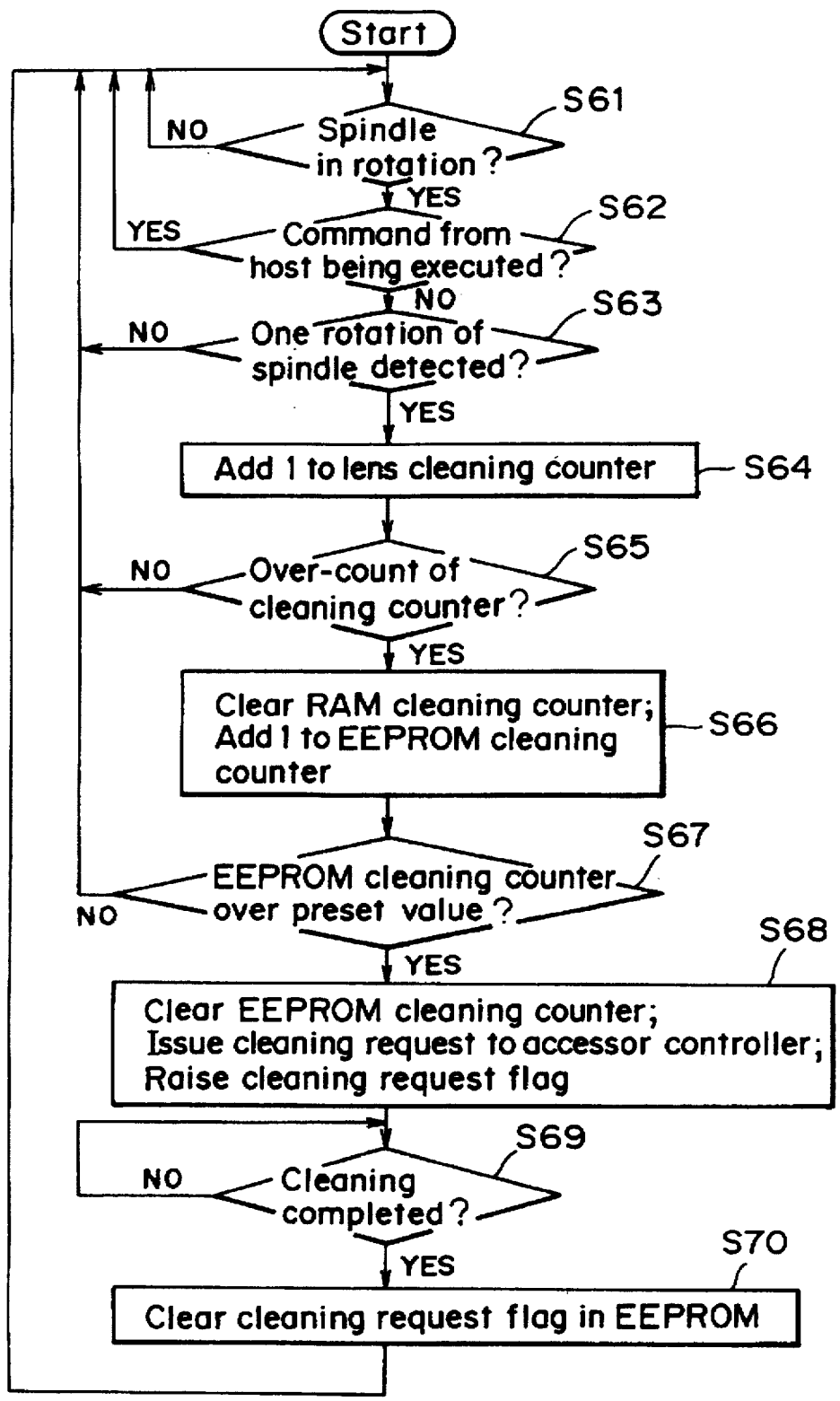
FIG. 18 is a flow chart of a procedure for cleaning control in a drive unit.

Referring now to a flow chart of FIG. 18, an explanation will be given on how cleaning control is executed in the drive unit. First at step 61, the controller 51 makes a decision as to whether the spindle motor 67 is in rotation or not. In the case of no rotation, another decision is made again as to whether the spindle motor 67 is in rotation or not. And if the result of the decision signifies that the spindle motor 67 is in rotation, the procedure advances to step 62, where the controller 51 makes a decision as to whether an operation (seek or read/write operation) corresponding to a command from the host computer 8 is being executed or not. When the result of this decision signifies that the command is being executed, the procedure returns to step 61.

In case the result of the decision at step 62 is negative, the procedure advances to step 63 where the controller 51 checks a one-rotation pulse of the spindle motor 67, and when no such a pulse is detected, the procedure returns to step 61. If a rotation pulse is detected at step 63, the procedure advances to step 64 where "1" is added to the numerical value of the cleaning counter in the RAM 68. Subsequently at step 65, a decision is made as to whether the numerical value of the cleaning counter is an over-count (above a predetermined value) or not. And if the result is negative, the procedure returns to step 61.

When the result of the decision at step 65 signifies that the numerical value of the cleaning counter in the RAM 68 is an over-count, the procedure advances to step 66, where the controller 51 clears the cleaning counter and adds "1" to the numerical value of the cleaning counter in the EEPROM 69. Thereafter at step 67, the controller 51 makes a decision as to whether the numerical value of the cleaning counter in the EEPROM 69 has exceeded a predetermined value or not. If the result of such a decision signifies that the counted value has not yet reached the predetermined value, the procedure returns to step 61.

In case the above result signifies that the counted numerical value of the cleaning counter in the EEPROM 69 is in excess of the predetermined value, the procedure advances to step 68 where the controller 51 clears the numerical value of the cleaning counter in the EEPROM 69. Further the controller 51 outputs a cleaning request signal to the accessor controller 10 and raises a cleaning flag in the EEPROM 69. Thereafter at step 69, the controller 51 makes a decision as to whether the optical head of the drive unit 6 has been cleaned or not. And if the result of such a decision signifies termination of the head cleaning, the controller 51 clears the cleaning flag in the EEPROM 69, and then the procedure returns to step 61.

Hereinafter the drive information in the nonvolatile memory will be described in detail with reference to FIG. 19. The drive information in the nonvolatile memory 40 incorporated in the accessor controller 10 is stored in such a manner as shown in FIG. 19. In this diagram, bits 0 to 7 are arrayed horizontally, while byte addresses 0 to 13 are arrayed vertically. The information in each area is as follows. "Element Address" denotes an address in the drive unit 6; "FULL" denotes the presence (in) or absence (out) of a cartridge; "FLAG" denotes a cleaning request flag; and "Source Storage Element Address" denotes an address from which a cartridge is carried.

"ACCESS" denotes whether this drive unit is accessible or not; "EXCEPT" denotes whether this drive unit is normal or not; "Additional Sense Code" represents error information; "Additional Sense Qualifier" also represents error information; "Valid" denotes whether a source element address and an invert bit are valid or not; and "Invert" denotes whether a medium is inverted or not at the time of insertion.

Next, the cleaning cartridge information in the nonvolatile memory 40 will be described in detail below with reference to FIG. 20. In this diagram, bits 0 to 7 are arrayed horizontally, while byte addresses 0 to 9 are arrayed vertically. The information in each area is as follows. "Element Address" denotes an address of the cleaning cartridge 36; "ACCESS" denotes whether this drive unit is accessible or not; "EXCEPT" denotes whether this drive unit is normal or not; "Additional Sense Code" represents error information;

"Additional Sense Qualifier" also represents error information; "FULL" denotes the presence (in) or absence (out) of a cartridge; "Cleaning Number" indicates the total number of times of using this cleaning cartridge; and "Service Life of Cleaning Cartridge" indicates a numerical value which is to be inputted to the host computer when the total number of times of cleaning operations has exceeded a predetermined value.

Figure 21A:
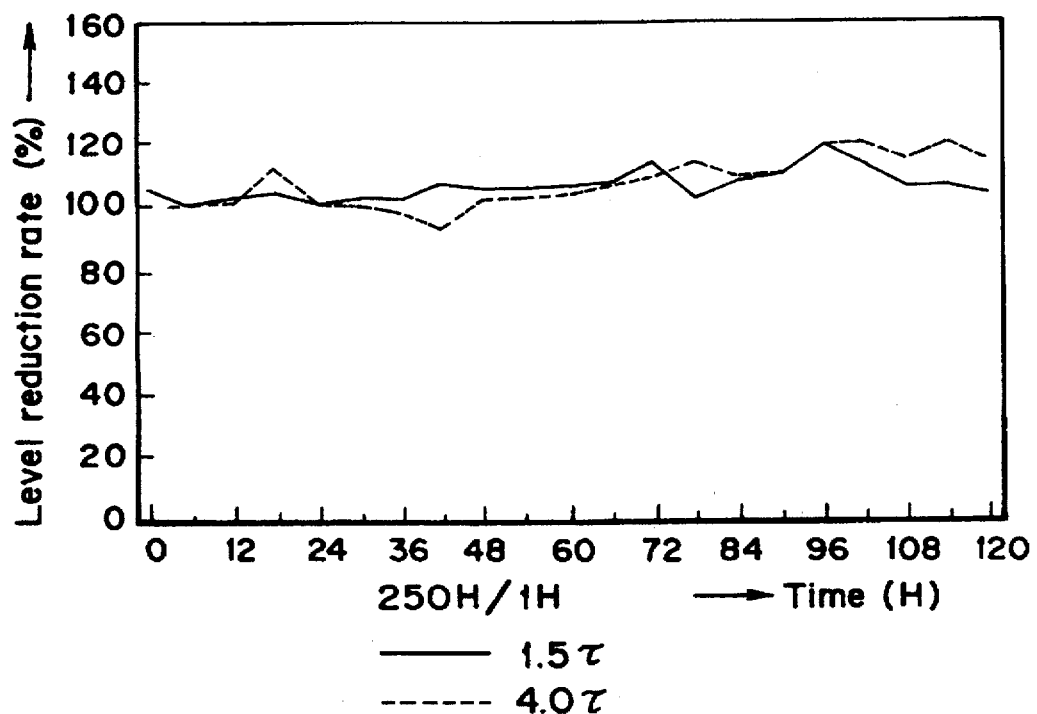
FIG. 21A graphically shows data that represents reduction rates of a reflected light level resulting from soil of a head.
Figure 21B:
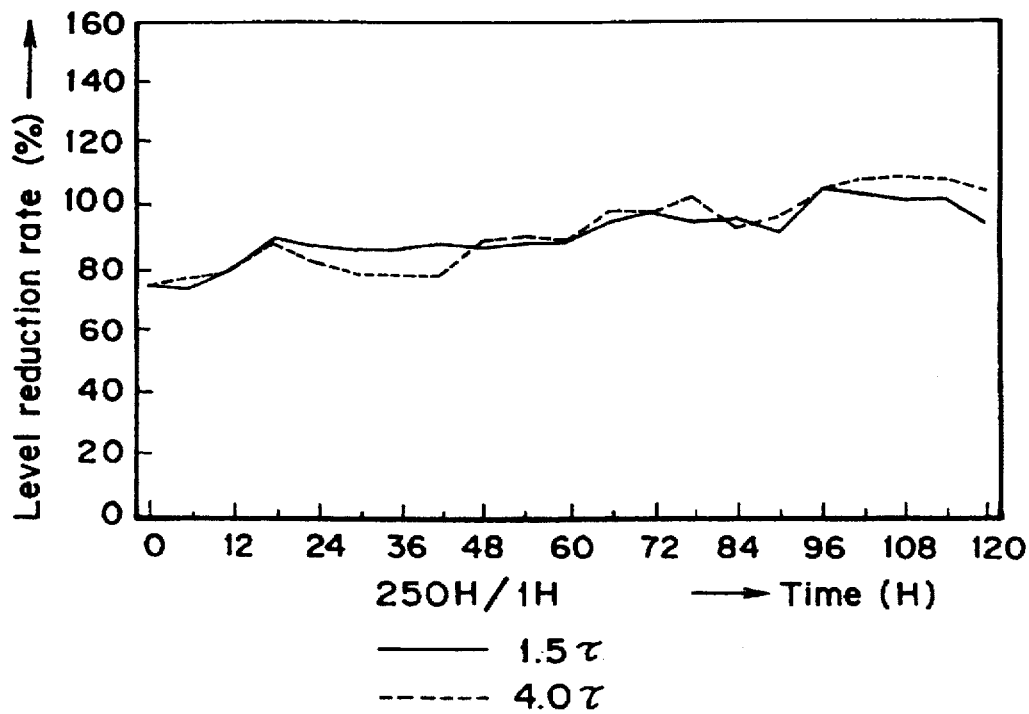
FIG. 21B graphically shows data that represents reduction rates of a reflected light level resulting from soil of a medium.

Referring now to FIGS. 21A and 21B, an explanation will be given on the reduction rates of a reflected light level obtained experimentally by the use of a dust acceleration tester. It is defined here that actual one hour in this acceleration test corresponds to 250 hours in the drawings. FIG. 21A graphically shows the reduction rate data of a reflected light level caused by soil of a head lens, and FIG. 21B graphically shows the reduction rate data of a reflected light level caused by soil of a medium.

In these graphic diagrams, the abscissa indicates the lapse of time, and the ordinate indicates the reduction rates (%) of a reflected light level. A solid line represents data of $1.5\tau$ (where $\tau$: clock frequency) and a dotted line represents data of $4.0\ \tau$. The level reduction rate (%) denotes the value obtained by calculating (signal level from master medium) /(signal level from soiled medium)×100 (%). In measuring the level reduction rate that results from soil of the head, the following measurement was repeated at an interval of 6 hours, and the shown data were obtained by cleaning the head after each measurement.

As for the method of measurement, first a head cleaning operation is performed and then the drive unit 6 is actuated for 6 hours. After a lapse of 6 hours, an unsoiled master medium is inserted into the drive unit, and a signal of the reflected light level is measured. Subsequently the medium used for 6 hours is inserted into the drive unit, and another signal of the reflected light level is measured. Then the reduction rate of the reflected light level is calculated by computing the ratio of the two reflected-light level signals thus obtained, whereby the soil of the optical head can be measured. The data shown graphically in the diagrams were acquired by the procedure mentioned above.

The level reduction rate is rendered higher than 100% due to removal of the soil of the objective lens by the head cleaning, but a satisfactory state is achieved if this value is approximate to 100%. As obvious from FIG. 21A, the reduction rate of the reflected light level is attained substantially constant even after a lapse of 120 hours (corresponding 30000 hours in the diagram). Consequently, it has been experimentally verified that an adequate reduction rate (approximately 100%) of the reflected light level can be maintained by performing the head cleaning operation as described in the above embodiment.

The reduction rates of the reflected light level caused by soil of a medium have also been experimentally measured in the same manner as the above, and the data thus acquired is graphically shown in FIG. 21B. In this case, the reduction rate (%) of the reflected light level is obtained by calculating (the signal level from a soiled medium in the master unit)/ (the signal level from a soiled medium in the soiled unit)× 100% present invention where none of medium cleaning is performed, the reduction rate of the reflected light level is raised with the lapse of time in the data of FIG. 21B.

Figure 22:
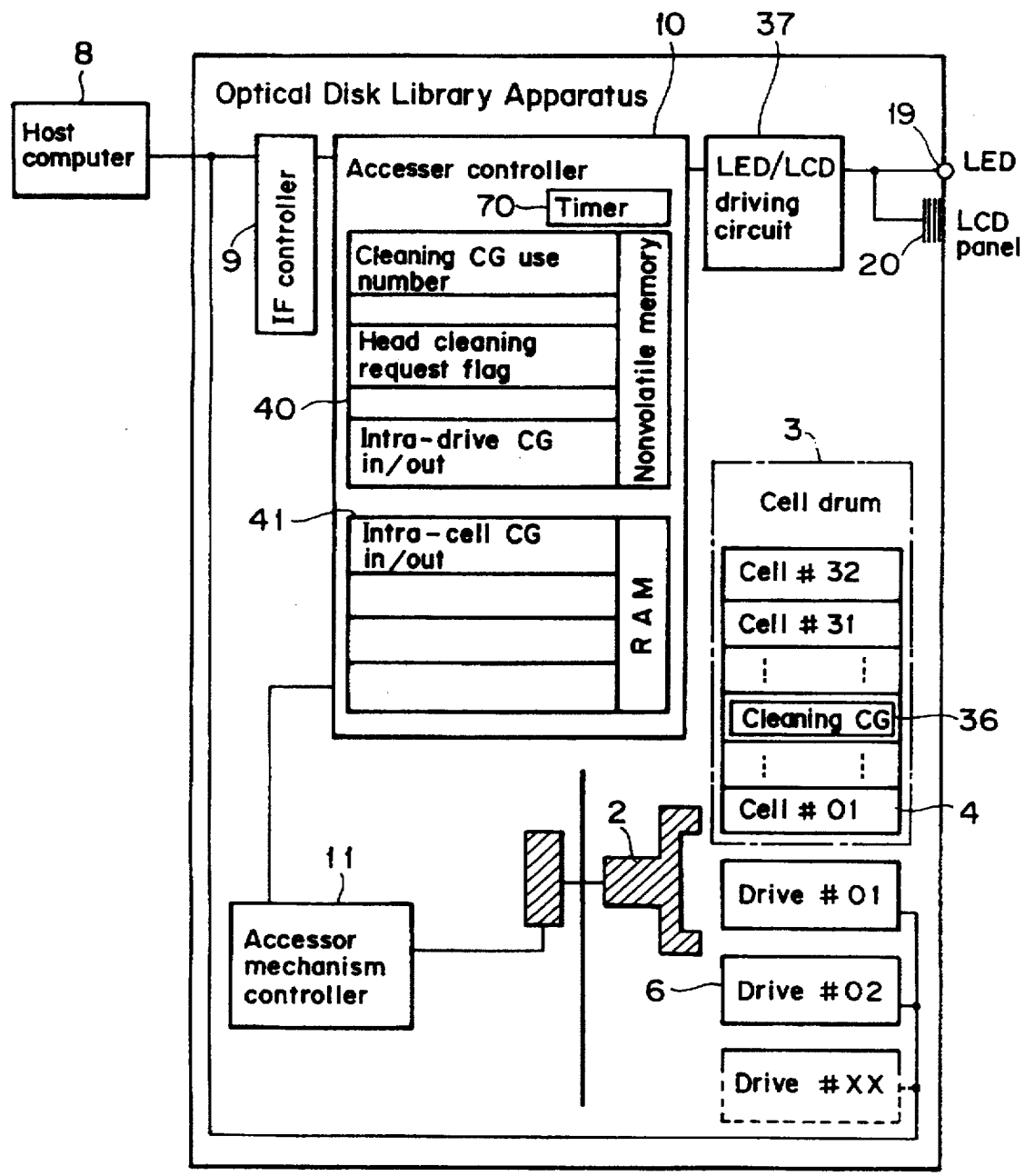
FIG. 22 is a block diagram of another embodiment according to the present invention.
Figure 23:
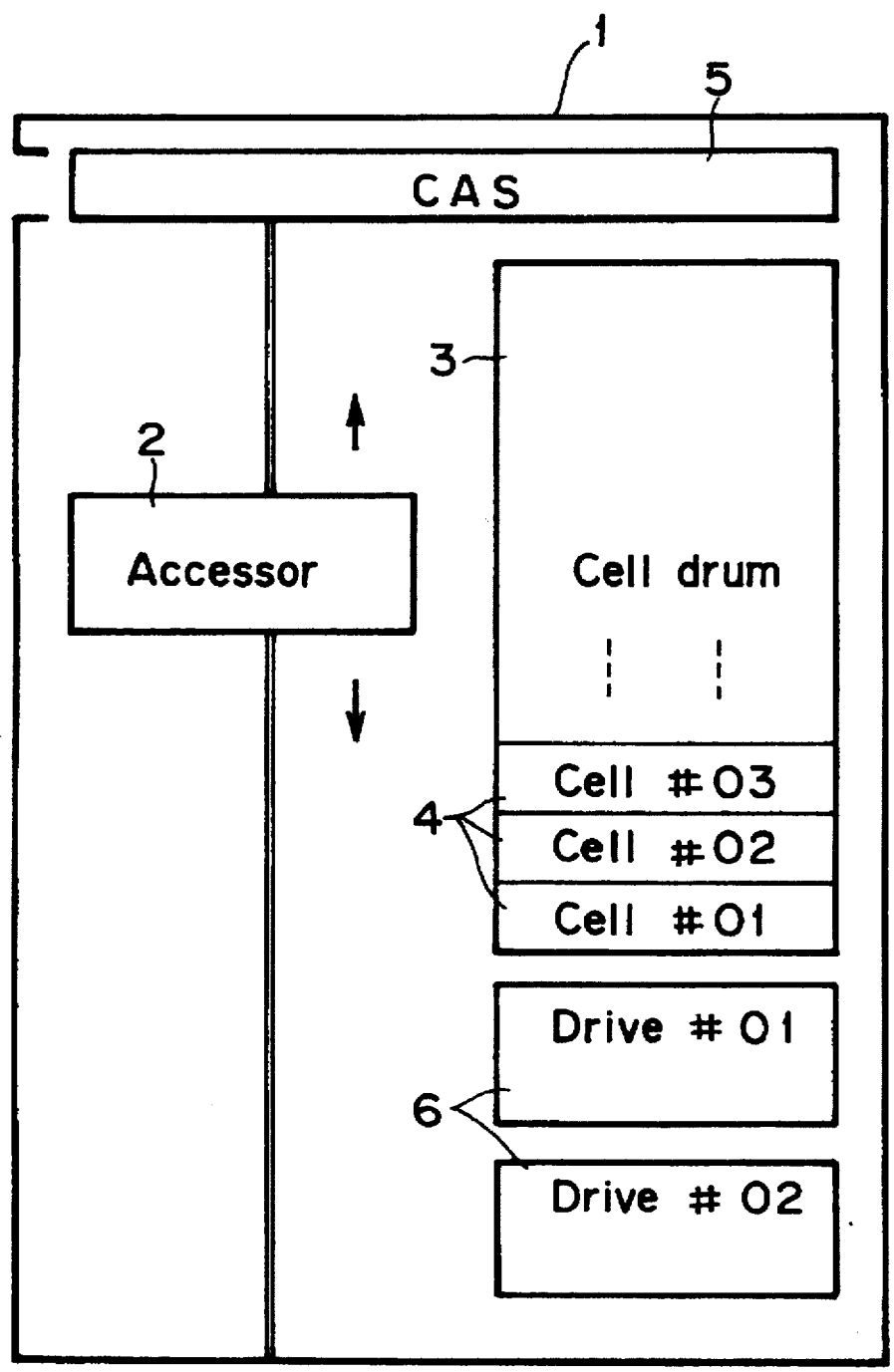
FIG. 23 is a schematic explanatory diagram of a conventional optical disk library apparatus.

FIG. 22 is a block diagram of another embodiment according to the present invention. A drive unit 6 employed in this embodiment is a type which does not output any cleaning request signal. In this embodiment, an accessor controller 10 has a timer 70 for measuring an accumulated time period during which a cartridge is inserted into the drive unit.

Figure 17:
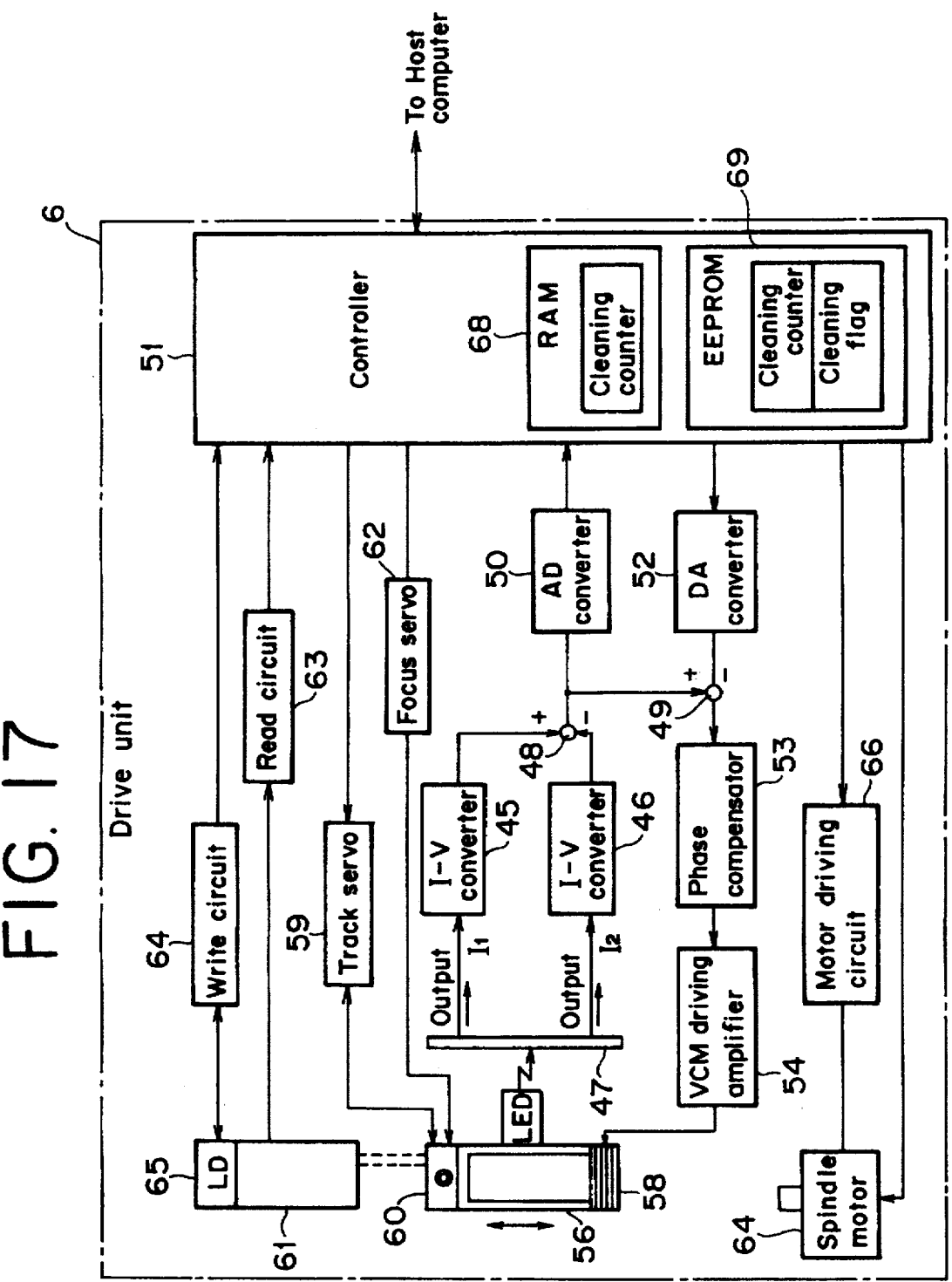
FIG. 17 is a block diagram of a drive unit.

More specifically, this embodiment has no cleaning counter in the controller 51 shown in FIG. 17, and the timer 70 functions in place of a cleaning counter. When the accumulated time period measured by the timer 70 has reached 1000 hours for example, the accessor controller 10 displaces the accessor 2, and a cleaning cartridge 36 held in a specific cell is carried up to the relevant drive unit to thereby clean the optical head automatically in the drive unit. Since the other constitution of this embodiment is similar to that of the aforementioned embodiment shown in FIG. 1, a repeated explanation thereof is omitted here.

According to the present invention, whenever it becomes necessary to clean the optical head in the drive unit, a desired head cleaning operation can be performed automatically without any manipulation by an operator. Consequently, maintenance service is simplified with another advantage of enhanced reliability of the whole apparatus. And due to automatic head cleaning, any harmful influence resulting from soil of the head is removable even in all-night running of the optical disk library apparatus.

Furthermore, the information relative to the head cleaning is visually represented on the display panel, whereby it is rendered possible for the operator to recognize from outside that the head cleaning is being performed now. In addition, since the time to replace the cleaning cartridge is visually represented on the display panel, the operator is informed of the necessary replacement time of the cleaning cartridge with ease, hence facilitating the maintenance service. Besides the above, the accessor is capable of discriminating whether any cartridge inserted into the library apparatus is an ordinary disk cartridge or a cleaning cartridge, thereby diminishing the load imposed on the host computer which controls the library apparatus.

What is claimed is:

1. An optical disk library apparatus for connection to a host computer comprising:

a cartridge entry/eject mechanism for entering optical disk cartridges into the library apparatus and ejecting optical disk cartridges from the library apparatus;

a cell unit having a plurality of cells each for holding an optical disk cartridge therein;

a drive unit having an optical head for reading data on and/or for reproducing the same from optical disk cartridges, and for outputting a head cleaning request signal on the basis of information relative to soil of said optical head, said drive unit further having a spindle motor for rotating an optical disk and a cleaning counter for measuring a rotation time of said spindle motor, and when said rotation time measured by said cleaning counter has reached a preset value, said head cleaning request signal is outputted;

an accessor for carrying optical disk cartridges among said cartridge entry/eject mechanism, said cell unit and said drive unit;

a cleaning cartridge held in said cell unit to perform a head cleaning operation; and accessor control means for receiving said head cleaning request signal output from said drive unit, and for controlling said accessor to carry said cleaning cartridge from said cell unit to said drive unit in response to said head cleaning request signal, wherein, when said drive unit determines that head cleaning is necessary and outputs said head cleaning request signal, said optical head is automatically cleaned by a use of said cleaning cartridge when said accessor control means command said accessor to carry said cleaning cartridge to said drive unit to initiate said head cleaning operation.

2. The optical disk library apparatus according to claim 1, further comprising a cleaning cartridge discrimination means provided in said cartridge entry/eject mechanism.

3. The optical disk library apparatus according to claim 2, wherein, when an entered cartridge is discriminated to be a cleaning cartridge by said cleaning cartridge discrimination means, said accessor control means controls said accessor to insert said cleaning cartridge into a predetermined cell of said cell unit.

4. The optical disk library apparatus according to claim 1, further comprising a display means for displaying information concerning to head cleaning, wherein, when said optical head is being currently cleaned, said display means displays the information indicate head cleaning duration.

5. The optical disk library apparatus according to claim 4, wherein said accessor control means has a nonvolatile memory to store a number of times of using said cleaning cartridge, and adds numerical one to the number stored in said nonvolatile memory every time a head cleaning operation is performed, and when said number has reached a preset value, said display means displays information indicative of the necessity of replacing the cleaning cartridge.

6. An optical disk library apparatus for connection to a host computer comprising:

a cartridge entry/eject mechanism for entering optical disk cartridges into said library apparatus and ejecting optical disk cartridges from said library apparatus;

a cell unit having a plurality of cells each for holding an optical disk cartridge therein;

a drive unit having an optical head for recording data on and/or for reproducing the same from optical disk cartridges;

an accessor for carrying optical disk cartridges among said cartridge entry/eject mechanism, said cell unit and said drive unit;

a cleaning cartridge held in said cell unit to perform a head cleaning operation;

accessor control means having a timer to measure accumulated use time of said drive unit for controlling said accessor, said accessor control means outputting a command to the accessor to carry the cleaning cartridge from said cell unit to said drive unit when the measured accumulated use time equals a predetermined time so that, when said accumulated use time measured by said timer has, reached said predetermined time, said optical head is automatically cleaned through the use of said cleaning cartridge carried by said accessor; and display means for displaying information concerning head cleaning, wherein, when said optical head is being currently cleaned, said display means display information to indicate a head cleaning duration.

7. The optical disk library apparatus according to claim 6, further comprising a cleaning cartridge discrimination means provided in said cartridge entry/eject mechanism.

8. The optical disk library apparatus according to claim 7, wherein, when an entered cartridge is discriminated to be a cleaning cartridge by said cleaning cartridge discrimination means, said accessor control means controls said accessor to insert said cleaning cartridge into a predetermined cell of said cell unit.

9. The optical disk library apparatus according to claim 6, wherein said accessor control means has a nonvolatile memory to store a number of times of using said cleaning cartridge, and adds numerical one to the number in stored said nonvolatile memory every time a head cleaning operation is performed, and when said number has reached a preset value, said display means displays information indicative of the necessity of replacing the cleaning cartridge.

10. An optical disk library apparatus for connection to a host computer comprising:

a cell unit having a plurality of cells, each for holding an optical disk cartridge therein;

a drive unit having an optical head for reproducing data from said optical disk cartridge, and for outputting a head cleaning request signal on the basis of information relative to soil of said optical head, said drive unit further having a spindle motor for rotating an optical disk and a cleaning counter for measuring a rotation time of said spindle motor, and when said rotation time measured by said cleaning counter has reached a preset value, said head cleaning request signal is outputted;

an accessor for carrying said optical disk cartridge between said cell unit and said drive unit;

a cleaning cartridge held in said cell unit to perform a head cleaning operation; and accessor control means receiving said head cleaning request signal output from said drive unit, and for controlling said accessor to carry said cleaning cartridge from said cell unit to said drive unit in response to said head cleaning request signal, wherein, when said drive unit determines that head cleaning is necessary and outputs said head cleaning request signal, said optical head is automatically cleaned by the use of said cleaning cartridge when said accessor control means command said accessor to carry said cleaning cartridge to said drive unit to initiate said cleaning operation.

11. The optical disk library apparatus according to claim 10, further comprising display means for displaying information concerning head cleaning, wherein when said optical head id being currently cleaned, said display means displays the information to indicate head cleaning duration.

12. The optical disk library apparatus according to claim 11, wherein said accessor control means has a nonvolatile memory to store a number of times of using said cleaning cartridge, and adds numerical one to the number stored in said nonvolatile memory every time a head cleaning operation is performed, and when said number has reached a preset value, said display means displays information indicative of the necessity of replacing the cleaning cartridge.

13. An optical disk library apparatus for connection to a host computer comprising:

a cell unit having a plurality of cells, each for holding an optical disk cartridge therein;

a drive unit having an optical head for reproducing data from said optical disk cartridge, and for outputting a head cleaning request signal on the basis of information relative to soil of said optical head;

an accessor for carrying said optical disk cartridge between said cell unit and said drive unit;

a cleaning cartridge held in said cell unit to perform a head cleaning operation; and accessor control means for receiving said head cleaning request signal output from said drive unit, and controlling said accessor to carry said cleaning cartridge from said cell unit to said drive unit in response to said head cleaning request signal, said optical head being automatically cleaned by the use of said cleaning cartridge carried by said accessor when said head cleaning request signal is outputted, said accessor control means further having a timer to measure accumulated use time of said drive unit for controlling said accessor, and when said measured accumulated use time equals a predetermined time, carrying said cleaning cartridge from said cell unit to said drive unit, p1 wherein, when said accumulated use time measured by said timer has reached said predetermined time, said optical head is automatically cleaned through the use of said cleaning cartridge carried by said accessor.

* * * * *

UNITED STATES PATENT AND TRADEMARK OFFICE
CERTIFICATE OF CORRECTION

PATENT NO. : 5,684,766

DATED : November 4, 1997

INVENTOR(S) : Inoue et al.

Page 1 of 2

It is certified that error appears in the above-identified patent and that said Letters Patent is hereby corrected as shown below:

Column 1, line 25, delete "or" and insert --for-- therefor.

Column 11, line 10, delete "Given" and insert --given-- therefor.

Column 12, line 19, after "programmed" insert --so--.

Column 17, line 58, delete "100%" and insert --100%. In the-- therefor.

UNITED STATES PATENT AND TRADEMARK OFFICE
CERTIFICATE OF CORRECTION

PATENT NO. : 5,684,766
DATED : November 4, 1997
INVENTOR(S) : Inoue et al.

It is certified that error appears in the above-identified patent and that said Letters Patent is hereby corrected as shown below:

Column 19, line 15, after "concerning" delete "to".

Column 19, line 17, after "information" insert --to--.

Column 19, line 51 after "predetermined time" insert --,--.

Column 20, line 49, delete "id" and insert --is-- therefor.

Column 22, line 7, delete "p1".

Signed and Sealed this

Eleventh Day of August 1998

Attest:

Attesting Officer

BRUCE LEHMAN
Commissioner of Patents and Trademarks